US 8,064,321 B2

(12) United States Patent
Rees et al.

(10) Patent No.: US 8,064,321 B2
(45) Date of Patent: *Nov. 22, 2011

(54) HYBRID LASER DIODE DRIVERS THAT INCLUDE A DECODER

(75) Inventors: Theodore D. Rees, Mountain View, CA (US); Akihiro Asada, Chigasaki (JP)

(73) Assignee: Intersil Americas Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/897,571

(22) Filed: Oct. 4, 2010

(65) Prior Publication Data
US 2011/0019522 A1 Jan. 27, 2011

Related U.S. Application Data

(63) Continuation of application No. 11/749,636, filed on May 16, 2007, now Pat. No. 7,813,247.

(60) Provisional application No. 60/819,082, filed on Jul. 6, 2006.

(51) Int. Cl.
*G11B 7/00* (2006.01)
(52) U.S. Cl. ...................................... 369/116; 369/59.11
(58) Field of Classification Search ........................ None
See application file for complete search history.

(56) References Cited

U.S. PATENT DOCUMENTS

| | | |
|---|---|---|
| 5,136,152 A | 8/1992 | Lee |
| 5,216,659 A | 6/1993 | Call et al. |
| 5,309,424 A | 5/1994 | Ogawa |
| 5,418,770 A | 5/1995 | Ide et al. |
| 5,438,582 A | 8/1995 | Hoshino et al. |
| 5,463,600 A | 10/1995 | Kirino et al. |
| 5,495,463 A | 2/1996 | Akagi et al. |
| 5,579,294 A | 11/1996 | Ohta et al. |
| 5,680,384 A | 10/1997 | Seki et al. |
| 5,719,835 A | 2/1998 | Ishika |
| 5,745,451 A | 4/1998 | Mukawa et al. |
| 5,777,964 A | 7/1998 | Furuta et al. |
| 5,790,491 A | 8/1998 | Jaquette et al. |
| 5,974,021 A | 10/1999 | Toda et al. |
| 6,154,433 A | 11/2000 | Hoshino et al. |
| 6,269,059 B1 | 7/2001 | Kuroda et al. |

(Continued)

FOREIGN PATENT DOCUMENTS
EP      1 067529 A2      1/2001
(Continued)

OTHER PUBLICATIONS

Sony CX News, vol. 30, "CXA2640ER, 3-Channel LD Driver for Optical Disc Drive, Preliminary," #PE02223-PS, 13 pp., Late 2002 or Early 2003.

(Continued)

*Primary Examiner* — Thang Tran
*Assistant Examiner* — Brian Butcher
(74) *Attorney, Agent, or Firm* — Fliesler Meyer LLP

(57) ABSTRACT

Provided herein are hybrid laser diode drivers (LDDs) that drive a laser diode in response to receiving enable signals from a controller. In accordance with specific embodiments, a hybrid LDD includes a read channel to selectively output a read current, one or more write channel each to selectively output a write current, and an oscillator channel to selectively output an oscillator current. Additionally, in specific embodiments the hybrid LDD includes a decoder that receives the enable signals from the controller, and based on the enable signals, controls timing of the currents output by the read, write and oscillator channels.

22 Claims, 26 Drawing Sheets

U.S. PATENT DOCUMENTS

| | | |
|---|---|---|
| 6,359,847 B1 | 3/2002 | Shimizu |
| 6,400,735 B1 | 6/2002 | Percey |
| 6,414,932 B1 | 7/2002 | Kaku et al. |
| 6,442,115 B1 | 8/2002 | Shimoda et al. |
| 6,442,118 B1 | 8/2002 | Hoshino et al. |
| 6,483,791 B1 | 11/2002 | Asada et al. |
| 6,487,154 B1 | 11/2002 | Kurebayashi et al. |
| 6,552,987 B1 | 4/2003 | Asada et al. |
| 6,558,987 B2 | 5/2003 | Lee |
| 6,636,472 B2 | 10/2003 | Hoshino et al. |
| 6,654,328 B2 | 11/2003 | Kaku et al. |
| 6,674,702 B2 | 1/2004 | Asada et al. |
| 6,683,823 B2 | 1/2004 | Saga et al. |
| 6,687,208 B2 | 2/2004 | Asada et al. |
| 6,721,255 B1 | 4/2004 | Gushima et al. |
| 6,721,261 B2 | 4/2004 | Kaku et al. |
| 6,738,339 B2 | 5/2004 | Gyo |
| 6,775,216 B2 | 8/2004 | Kelly et al. |
| 6,954,410 B2 | 10/2005 | Hoshino et al. |
| 7,149,164 B2 | 12/2006 | Tsukihashi et al. |
| 2002/0126609 A1 | 9/2002 | Kaku et al. |
| 2003/0007438 A1 | 1/2003 | Kim et al. |
| 2003/0112732 A1 | 6/2003 | Masui et al. |
| 2005/0025031 A1 | 2/2005 | Kodama et al. |
| 2007/0173960 A1 | 7/2007 | Kumar |
| 2008/0008062 A1 | 1/2008 | Rees et al. |
| 2008/0008066 A1 | 1/2008 | Rees et al. |

FOREIGN PATENT DOCUMENTS

| | | |
|---|---|---|
| JP | 11-213426 | 6/1999 |
| KR | 2008-0030917 | 4/2008 |
| WO | WO 02/29793 A2 | 4/2002 |

OTHER PUBLICATIONS

Sony CX News, vol. 32, "CXA2680ER," #J02Y22, 19 pp., May 2003.

Sony CX News, vol. 32, "CXA2674EM/CXA2673EM, Optical Pickup Chipset with Photodetector PDIC for Blue-Violet Laser Diodes," 2 pp., May 2003.

Sony CX News, "CXA2610AN, Laser Driver," #E00145A17, 10 pp., No Date.

Mitsubishi, "M61880FP," 14 pp., No Date.

Mitsubishi (Digital ASSP), "M66510P/FP Laser-Diode Driver," 10 pp., No Date.

Mitsubishi (Digital ASSP), "M66512P/FP, Laser-Diode Driver," 10 pp., No Date.

Mitsubishi (Digital ASSP), "M66515FP, Laser-Diode Driver/Controller," 7 pp., No Date.

Mitsubishi (Digital ASSP), "M66516FP, Laser-Diode Driver/Controller," 10 pp., No Date.

International Search Report and Written Opinion for PCT/US2009/046381, No Date.

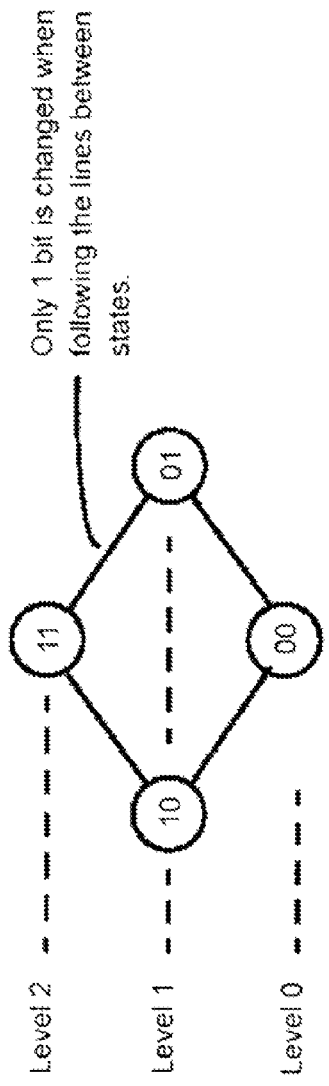
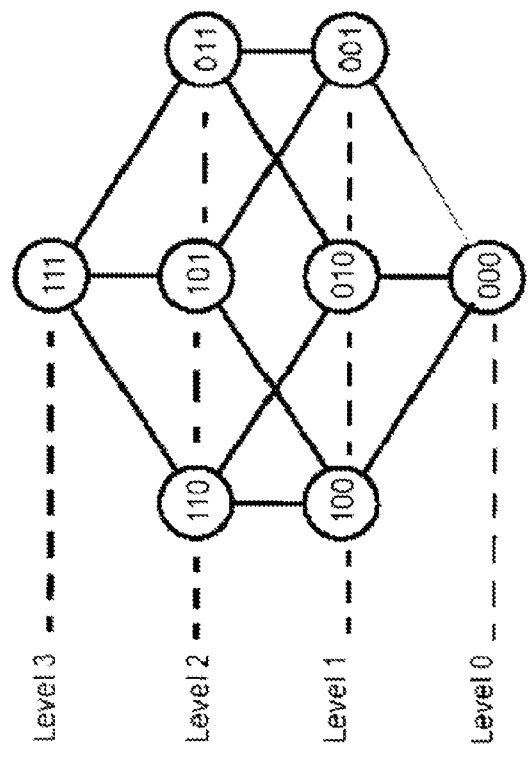
FIG. 10A Two Bit Gray Transition Diagram
FIG. 10B Three Bit Gray Transition Diagram Four Bit Gray Transition Diagram

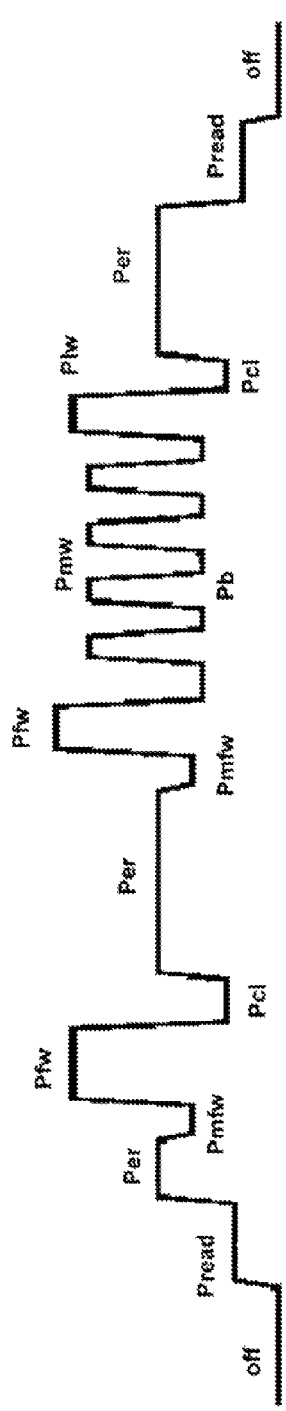
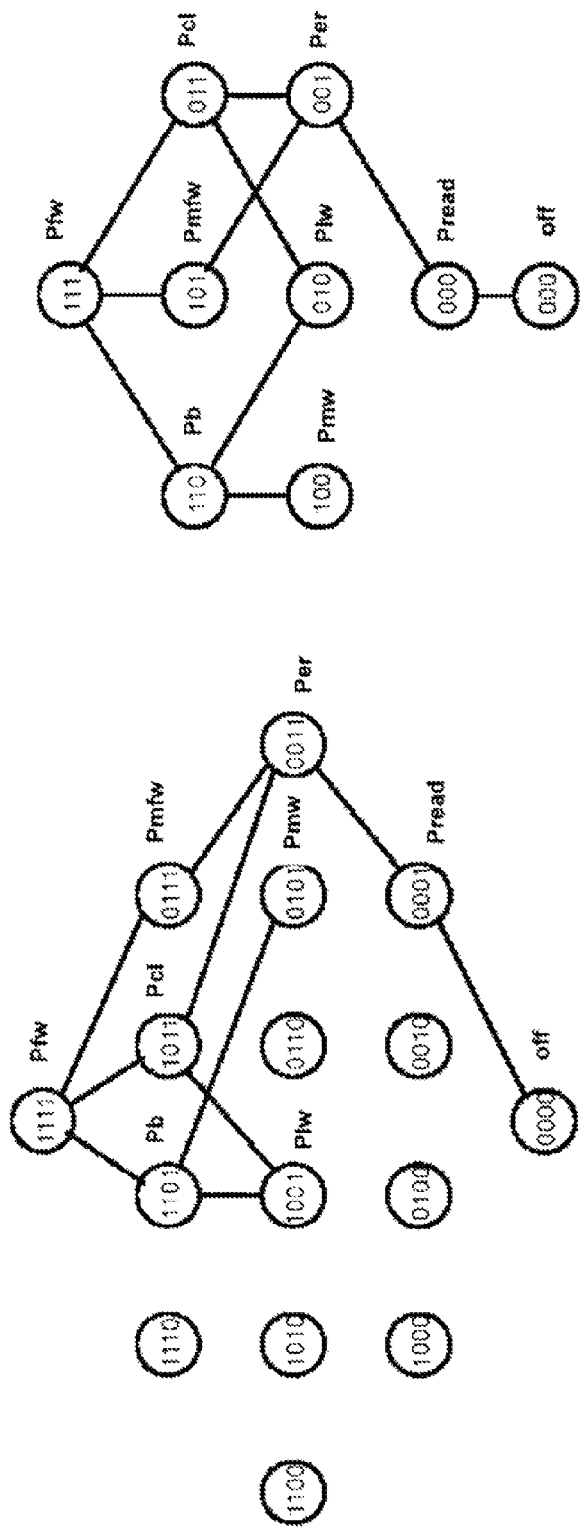
FIG. 13A
FIG. 13B
FIG. 13C

SERIAL CONFIGURABLE READ ENABLE LOGIC

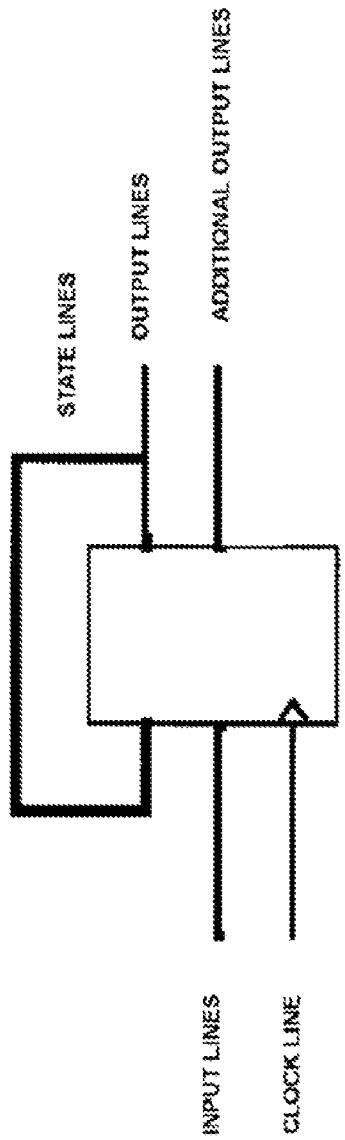
FIG. 18A  TYPICAL STATE MACHINE
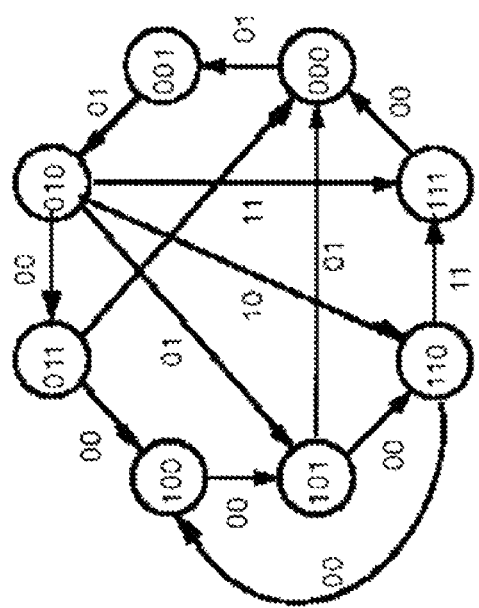
FIG. 18B  ARBITRARY STATE MACHINE EXAMPLE

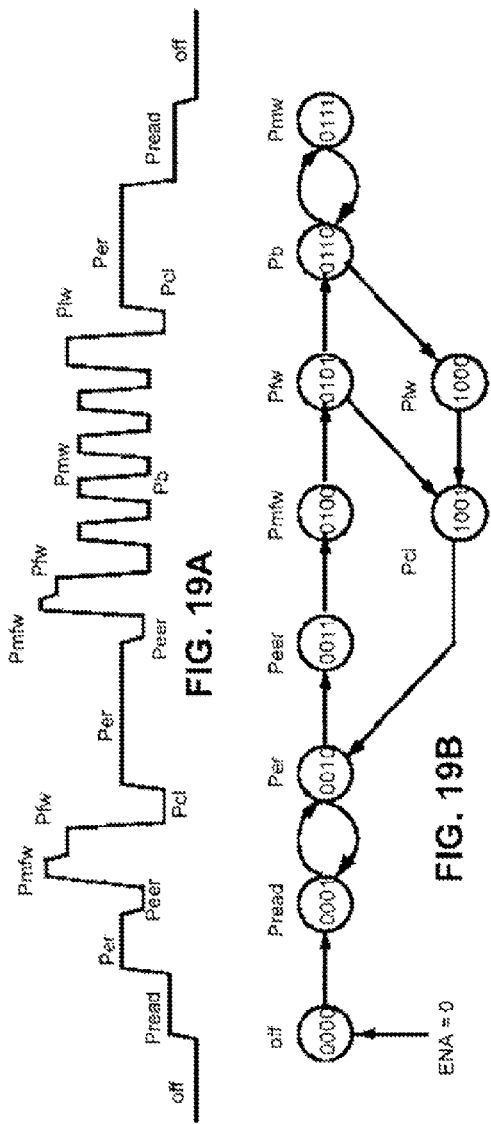
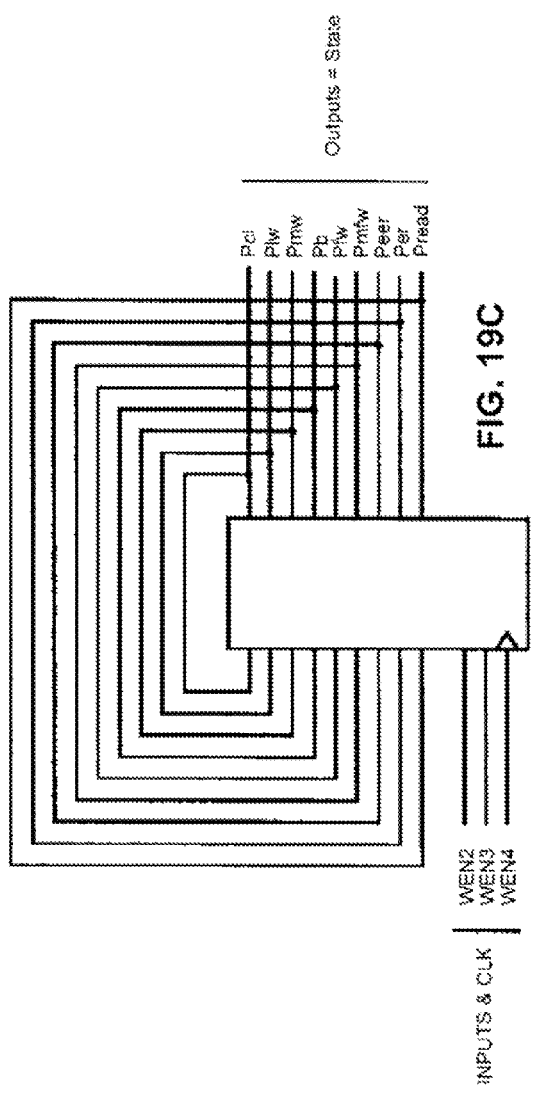
FIG. 19A
FIG. 19B
FIG. 19C

STATE MACHINE WITH EMBEDDED DECODER

HYBRID LASER DIODE DRIVERS THAT INCLUDE A DECODER

PRIORITY CLAIM

This application is a continuation of U.S. patent application Ser. No. 11/749,636, filed May 16, 2007, entitled HYBRID LASER DIODE DRIVERS THAT INCLUDE A DECODER, which claims priority under 35 U.S.C. 119(e) to U.S. Provisional Patent Application No. 60/819,082, filed Jul. 6, 2006, entitled HYBRID LASER DIODE DRIVER, both of which are incorporated herein by reference.

CROSS REFERENCE TO RELATED APPLICATION

This application relates to commonly assigned and commonly invention U.S. patent application Ser. No. 11/749,703, filed May 16, 2007, entitled HYBRID LASER DIODE DRIVERS THAT INCLUDE A STATE MACHINE, and U.S. patent application Ser. No. 12/897,654, filed Oct. 4, 2010, entitled HYBRID LASER DIODE DRIVERS THAT INCLUDE A STATE MACHINE, both of which are incorporated herein by reference.

FIELD OF THE INVENTION

The present invention relates to technology for recording information onto an information recording medium, such as an optical disk, and reading information from such a medium.

BACKGROUND

In the field of products concerning the optical disk technologies such as CD, DVD and the like, there is a tendency to increase both the storage capacity, and the speed of data transfer in order to be competitive and capture market share. There is also the tendency to include an increasing number of features into laser drivers. Additionally, factors such as media type, writing speed, disc format and drive optics necessitate particular write strategies. In order to be competitive and capture market share, there is a tendency to increase the number of features (e.g., formats) supported by a single laser diode driver (LDD), to thereby enable a single LDD to support both CD and DVD technologies, as well as new technologies such as Blu-ray Disk (BD).

Conventional LDDs suffer from the need for more and more pins as the number of features supported by LDDs increase. For example, conventional LDDs require an analog line and/or a digital line (or pair) for every output current level supported, which causes a high pin count as the number of output current levels supported increases. Further, each line is subject to noise pick-up or timing inaccuracy, leading to poor fidelity waveforms. Additionally, because of the remote control of output drive for both the write current and the oscillator timing, conventional LDDs also suffer from timing errors.

To solve the problems of conventional laser drivers, manufacturers began to incorporate write strategy generators (WSG) into LDDs. However, while WSG LDDs solve the above mentioned problems of conventional laser drivers, WSG LDDs include large amounts of complex digital circuits. Such circuits are costly. Additionally, such circuits increase the power consumption and heat output of the LDD. Further, many customers do not want to change the complex controller chip from a conventional type to a WSG type. If they do so, they often have difficulty learning to use and support the WSG that is within a WSG LDD.

SUMMARY

Embodiments of the present invention are related to hybrid laser diode drivers (LDDs) that drive a laser diode in response to receiving enable signals from a controller. In specific embodiments, the hybrid LDDs are configured to be located on a same optical pickup unit (OPU) as a laser diode, where the OPU is connected by a flex cable to the controller, and where the controller is on a main board.

In accordance with specific embodiments, a hybrid LDD includes a read channel to selectively output a read current, one or more write channel each to selectively output a write current, and an oscillator channel to selectively output an oscillator current. Additionally, in specific embodiments the hybrid LDD includes a decoder that receives the enable signals from the controller, and based on the enable signals, controls timing of the currents output by the read, write and oscillator channels.

Where the hybrid LDD includes a plurality of write channels, each of the write channels can output a different write current. In certain embodiments, each write channel includes a switch that is controlled by the decoder. In such embodiments, the decoder can control the timing of the write channels by controlling the switches, based on the enable signals.

In accordance with specific embodiments, the hybrid LDD also includes a plurality of registers to store amplitude values for the read and write channels, as well as a serial interface to receive serial data from the controller. The serial data is used to update the amplitude values stored in the registers. The amplitude values stored in the registers are used to define amplitudes of the currents output by the read and write channels. In specific embodiments, the serial data received from the controller is also used to configure the decoder.

In accordance with specific embodiments, the read channel can includes a digital-to-analog converter (read DAC) that receives a digital amplitude value from at least one of the registers and outputs an analog signal based thereon, which is used to produce the read current selectively output by the read channel. Additionally, each write channel can include a digital-to-analog converter (write DAC) that receives a digital amplitude value from at least one of the registers and outputs an analog signal based thereon, which is used to produce the write current selectively output by the write channel. Similarly, the oscillator channel can include a digital-to-analog converter (oscillator DAC) that receives a digital amplitude value from at least one of the registers and outputs an analog signal based thereon, which is used to produce the oscillator current selectively output by the oscillator channel.

In accordance with specific embodiments of the present invention, the currents output by the read, write and oscillator channels are summed together to produce a drive output current that drives the laser diode. In such embodiments, the decoder can control which currents are summed together to produce the drive output current.

In specific embodiments, the enable signals received by the decoder from the controller are gray coded such that only one of the enable signals changes at a time. The sequence of the gray coded enable signals should be compatible with the read and write sequences used. The decoder, based on the enable signals, controls the timing of the currents output by the read and write channels. A purpose of the gray coded enable signals is to avoid glitches in the drive output current that would be due to delay differences between the controller and the hybrid LDD.

In specific embodiments, the hybrid LDD includes a read/write channel to selectively output a current to drive the laser diode during reading and writing, and an oscillator channel to selectively output an oscillator current. Such a hybrid LDD can also include a decoder that receives the enable signals from the controller, and based on the enable signals, controls timing of the currents output by the read/write and oscillator channels. The read/write channel can include, e.g., a transistor having a current path and a control terminal, with the current path providing the current output by the read/write channel, and the control terminal being used to control the timing and amplitude of the current output by the read/write channel. Such a hybrid LDD can also include registers to store amplitude values for the read/write channel. The hybrid LDD can also include a serial interface to receive serial data from the controller, where the serial data is used to update the amplitude values stored in the registers, and where the amplitude values stored in the registers are used to define amplitudes of the currents output by the read/write channel.

In accordance with other embodiments of the present invention, a hybrid LDD can include a state machine, instead of a decoder. The state machine can receive enable signals from a controller, and based on the enable signals, can control timing of the currents output by the read, write and oscillator channels of the hybrid LDD.

In specific embodiments, the state machine can be configured such that a specific enable signal change specifies a path of the state machine at each state. In specific embodiments, the state machine is configured such that a different enable signal changes for each consecutive state change.

The state machine of a hybrid LDD can be configured to have a predetermined number of states that have a predetermined order, with each state corresponding to a different current output amplitude. The enable signals, received from the controller, can specify whether the state machine should progress in a forward direction or backward direction of the order.

A hybrid LDD including a state machine can also include registers to store amplitude values for the read and write channels, as well as a serial interface to receive serial data from the controller. The serial data can update the amplitude values stored in the registers, where the amplitude values stored in the registers are used to define amplitudes of the currents output by the read and write channels for various states of the state machine. The serial data received from the controller, via the serial interface, can also be used to configure the state machine, in specific embodiments.

Where the currents output by the read, write and oscillator channels are summed together to produce a drive output current that drives the laser diode, the state machine can control which currents are summed together to produce the drive output current. Additionally, the state machine can change state, based on the enable signals, to thereby control the timing of the currents output by the read and write channels.

In specific embodiment, the enable signals received by the state machine from the controller are gray coded such that only one of the enable signals changes at a time. A purpose of the gray coded enable signals is to avoid glitches in the drive output current that would be due to delay differences between the controller and the hybrid LDD.

In specific embodiments, wherein the hybrid LDD includes a read/write channel to selectively output a current to drive the laser diode during reading and writing, and an oscillator channel to selectively output an oscillator current, a state machine receives enable signals from a controller, and based on the enable signals, controls timing of the currents output by the read/write and oscillator channels. Such a read/write channel can include, e.g., a transistor having a current path and a control terminal, where the current path proves the current output by the read/write channel, and the control terminal is used to control the timing and amplitude of the current output by the read/write channel.

This summary is not intended to be a complete description of the embodiments of the present invention. Further and alternative embodiments, and the features, aspects, and advantages of the present invention will become more apparent from the detailed description set forth below, the drawings and the claims.

BRIEF DESCRIPTION OF THE DRAWINGS

FIG. 10A illustrates an exemplary two bit gray code transition diagram.

FIG. 10B illustrates an exemplary three bit gray code transition diagram.

FIG. 13A illustrates an exemplary $I_{OUT}$ signal including nine different levels.

FIG. 13B is a gray code transition diagram that shows how one bit can be changed at a time to transition from any of the $I_{OUT}$ levels shown in FIG. 13A and a next level, assuming four enable lines, besides the chip enable (ENA) line, are used.

FIG. 13C is a gray code transition diagram that is used to describe how transitions in the $I_{OUT}$ signal of FIG. 13A can be accomplished using only three enable lines, in addition to the chip enable (ENA) line and an additional write enable line.

FIG. 18A illustrates an exemplary diagram of a typical state machine. FIG. 18B illustrates an exemplary state diagram for an arbitrary state machine.

FIG. 19A illustrates an exemplary $I_{OUT}$ signal including ten different states. FIG. 19B is a corresponding state diagram for the write strategy producing the $I_{OUT}$ signal of FIG. 19A.

FIG. 19C illustrates a state machine wherein the output lines also serve as the state lines for the write strategy of FIG. 19A.

DETAILED DESCRIPTION

In the FIGS., like reference numbers and characters identify the same or similar elements throughout. However, this does not mean that elements numbered the same in different figures need be identical. Additionally, the left most digit(s) of a reference number indicates the FIG. where an element was first discussed.

Figure 1:
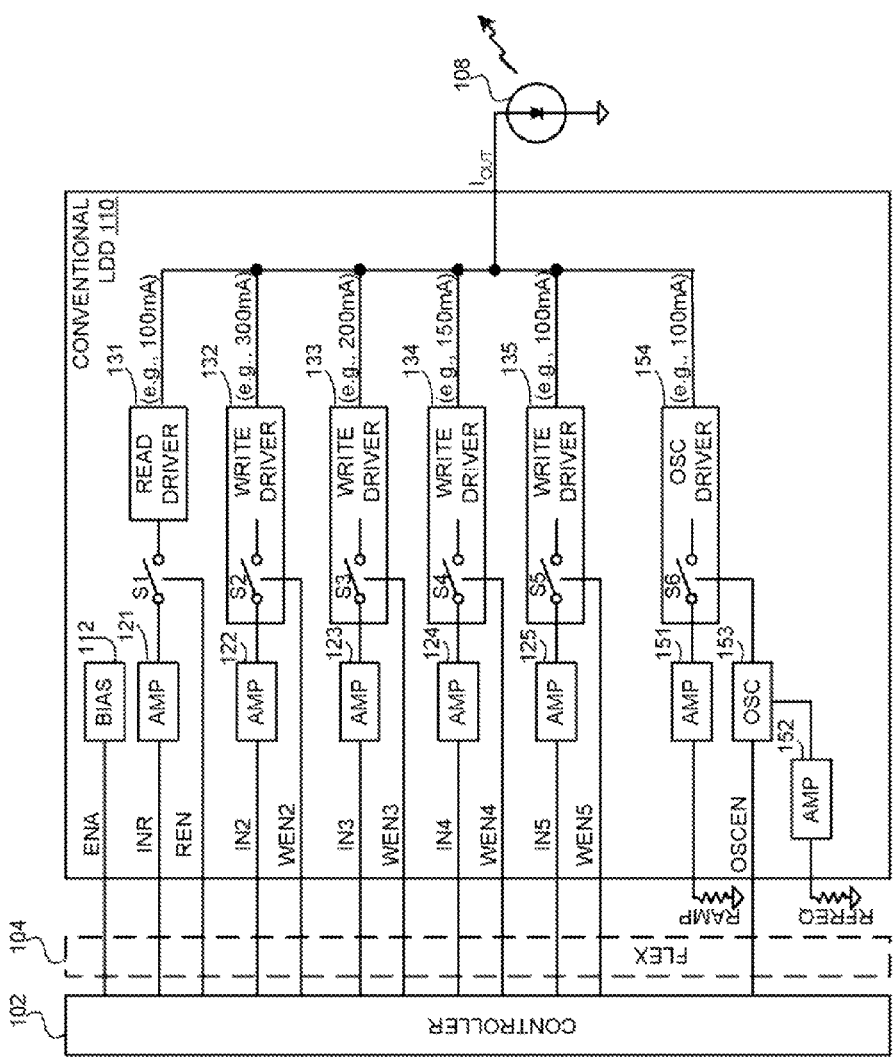
FIG. 1 is a high level block diagram illustrating an exemplary conventional laser diode driver (LDD).

FIG. 1 is a high level diagram showing an exemplary conventional laser diode driver (LDD) 110 of a data storage device in communications with a drive controller 102 (e.g., a host), across a flex cable 104. The data storage device can be, for example, an optical storage device that includes an optical disk media upon which user data can be stored. The LDD 110 drives a laser diode 108 in order to read data from and write data to the optical disk media. The LDD 110 is located on an optical pickup unit (OPU), and the controller 102 is located on a main circuit board, with the flex cable 104 allowing for communications there-between.

In the exemplary embodiment shown, the LDD 110 is shown as including a read channel, four write channels and an oscillator channel. The LDD is also shown as including a bias circuit 112, which receives a chip enable (ENA) signal from the controller 102. When the LDD 110 is enabled, via the ENA signal, the bias circuit generates bias voltages and currents that are used to bias the analog circuitry (e.g., amplifiers, drivers, etc.) of the LDD 110. When the LDD 110 is not enabled via the ENA signal the LDD will not drive the laser diode 108. The ENA signal may in addition directly logically disable the outputs.

The read channel includes an amplifier 121, an electronic switch S1 and a read driver 131. The read channel receives a level input (IN1) signal and a read enable (REN) signal from the controller 102. The INR signal, which is an analog current or voltage signal generated by the controller 102, is used to specify the amplitude of the signal output by the read channel when the read channel is enabled. The REN signal specifies when the read channel is enabled, and thus may be referred to as a timing or enable signal. The amplifier 121 performs pre-amplification of the IN1 signal. The read driver 131, when the read channel is enabled, performs further amplification of the signal output by the amplifier 121. The switch S1, which is controlled by the REN signal, is used to enable or disable the read channel. The switch S1 is shown as being outside the read driver 131, but can be within the read driver 131.

Four write channels are shown, although there can be more or less write channels. Each of the write channels is shown as including an amplifier, an electronic switch and a write driver. For example, one of the write channels, which receives the IN2 signal and the write enable (WEN2) signal is shown as including an amplifier 122, an electric switch S2 and a write driver 132. To enable fast switching it is preferred that the switch S2 is within the write driver 132. The IN2 signal, which is an analog current or voltage signal generated by the controller 102, is used to specify the amplitude of the signal output by the write channel when the write channel is enabled. The WEN2 signal is a timing signal that specifies when the write channel is enabled. The amplifier 122 performs pre-amplification of the IN2 signal. The write driver 132, when the write channel is enabled, performs further amplification of the signal output by the amplifier 122. The switch S2, which is controlled by the WEN2 signal, is used to enable or disable the write channel. The remaining write channels are similar, and thus need not be described in further detail. Since the write enable signals are used for controlling timing, such signals may also be referred to as timing or enable signals.

The oscillator channel is shown as including an amplifier 151, an amplifier 152, an oscillator 153, a switch S6 and an oscillator driver 154. Through use of the resistor RAMP (external to the LDD 110 but on the OPU), the amplifier 151 provides a signal to the oscillator driver 154, which is used to specify the amplitude of the signal that is output by the oscillator driver 154. Through use of the resistor RFREQ (external to the LDD 110 but on the OPU), the amplifier 152 provides a signal to the oscillator 153, which is used to specify the frequency of the signal that is output by the oscillator 153. The oscillating output of the oscillator 153 controls the switch S6 of the oscillator driver 154, to thereby output an oscillating signal whose amplitude and frequency is specified using the resistors RAMP and RFREQ. The oscillator 153 is enabled by the controller 102 via an oscillator enable (OSCEN) signal, which is provided across the flex cable 104. Thus, the oscillator channel only provides an oscillating output when the oscillator 153 is enabled.

Only one laser diode (i.e., 108) is shown in FIG. 1. One or more further laser diode can be added, so that the convention LDD supports multiple (e.g., CD, DVD, BD) formats. In such a case there would be a selection network used to specify which laser diode to drive. The controller 102 would control the selection network via additional connections through the flex cable 104.

Figure 2:
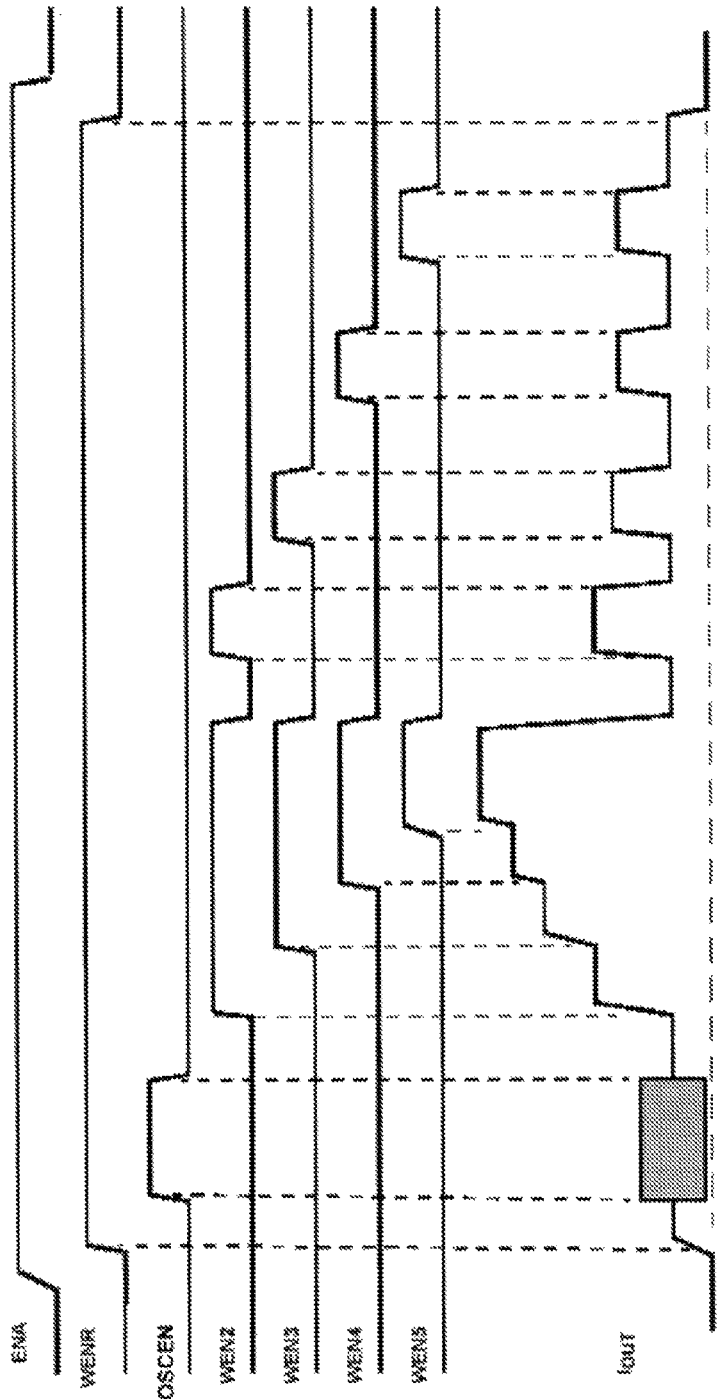
FIG. 2 is an exemplary timing diagram for the conventional LDD of FIG. 1.

The ENA, IN1-IN5, REN, WEN2-WEN5 and OSEN signals are all provided from the controller 102 to the LDD 110 across the flex cable 104. When more than one channel is enabled at once, the outputs of the multiple channels are added together to produce an output current $I_{OUT}$ drive signal that drives the laser diode 108. A single channel may also be enabled at a time. The exemplary timing diagram shown in FIG. 2 illustrates how the various outputs of the drivers can be added, or individually used, to generate the $I_{OUT}$ signal that drives the laser diode 108. At first glance, it might appear that there could be a useable output current $I_{OUT}$ for every combination of REN, OSCEN, and WEN2-WEN5 signals. But that is not the case. The write strategies require very precise amplitudes and times to properly mark the media. Because of this, there are usually a very limited number of useable combinations of output current. When writing to the media the read current is always on, resulting in the read current being added to the (one or more) selected write channel's current, to thereby generate $I_{OUT}$. When reading from the media the, oscillator is usually on, resulting in the output of the oscillator channel being added to the output of the read channel, to thereby generate $I_{OUT}$. During writing, the oscillator may or may not be on, depending on the decision of the drive designer.

One possible way to use the write enables is to have a different output current determined when one and only one WEN is enabled. The problem with this approach is that the total size of all of the output drivers is then excessive, causing excess cost and slow response. In practice the various output levels are obtained by adding together the various write currents in only a few specific combinations (as opposed to using all possible combinations). This usually results in one output level per control pin, due to the precise current requirements of the write process. Because the write currents are necessarily summed together, there is a timing glitch issue that is most severe when the current switches between a low value to a high value. This occurs at the most critical time, which is at the beginning and end of the mark.

Figure 3:
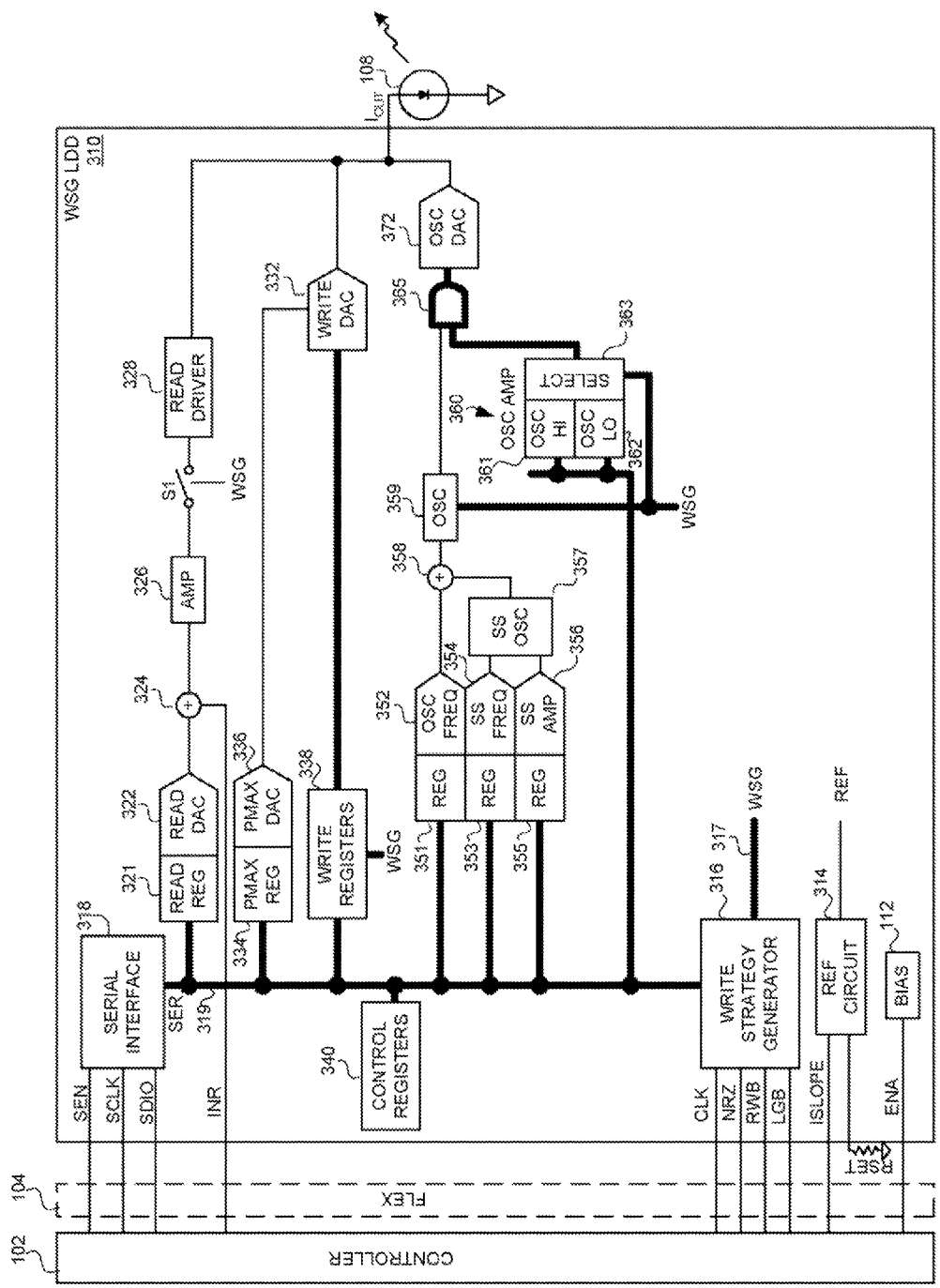
FIG. 3 is a high level block diagram illustrating an exemplary write strategy generator (WSG) LDD.

Referring now to FIG. 3, an exemplary write strategy generator (WSG) LDD 310 is shown as including a bias circuit 112, a reference circuit 314, a write strategy generator (WSG) 316, a serial interface 318, and various registers, digital-to-analog converters (DACs), oscillators, amplifiers and a driver, which are discussed below. A controller 102 communicates with the LDD 310 over a flex cable 104.

The bias circuit 112, when it receives a chip enable (ENA) signal from the controller 102, generates bias voltages and currents that are used to bias the analog circuitry of the LDD 310. The ENA signal also directly enables the outputs. The reference circuit 314, which receives an ISLOPE signal from the controller 112, and is connected to an RSET resistor on the OPU, generates various reference voltages and currents that are provided to the various DACs of the LDD 310.

The serial interface 318 receives from the controller 102 a serial enable (SEN) signal and a serial clock (SCLK) signal. Additionally, a bi-directional serial data input/output (SDIO) line allows the controller 102 to write data to and read data from registers within the LDD 310 via SER bus 319. For example, write strategy updates can be provided using the SDIO, serial interface, and serial (SER) bus 319. The SER bus 319 includes a data bus portions (e.g. 8 bits wide) and an address bus portion (e.g., 7 bits wide).

The write strategy generator (WSG) 316, which includes digital circuitry, provides digital signals (e.g., a collection of various timing signals) to the WSG bus 317 that are used to implement an appropriate write strategy, which may depend, for example, on the media, CD, DVD or BD standards, and/or the speed being supported. The WSG 316 receives from the controller 102 a data clock (CLK) and a read write mode signal (RWB). For example, a LOW RWB signal can designate WRITE, and a HIGH RWB signal can designate READ, or vise versa. The WSG 316 also receives a data line labeled NRZ (Non-Return-to-Zero), which is used to specify the when a mark is being written on a disk. The WSG 316 is also shown as receiving a land/groove bar (LBG) signal, which is used for DVD RAM type media. In this media the marks are made in both the land and groove portions of the media. The write current requirements are different when writing to the land or groove.

The read channel of the LDD 310 is shown as including a read DAC 322, an amplifier 326 and a read driver 328. The read DAC 322 outputs an analog signal having a level specified by the digital data level specified in a read register 321, which can be updated by the controller 102 via the serial interface 318 and SER bus 319. The controller 102 can also provide an analog INR signal that is added to the output of the read DAC by summer 324. The output of the read DAC 322 (with or without INR added thereto) is provided to the amplifier 326, and the output of the amplifier 326 is provided to the read driver 328. The WSG 316 can control when the read channel produces an output by controlling a switch S1 via the WSG bus 317. For example, a serial read enable signal can cause the WSG 316 to open or close switch S1.

The write channel of the LDD 310 is shown as including a write DAC 332 that receives a digital input from write registers 338. The WSG 316, via the WSG bus 317, selects which register of the write registers 338 will provide the digital input to the write DAC 332, to thereby control the amplitude of the signal output by the write channel. A PMAX DAC 336 converts a digital input received from a PMAX register to an analog output (referred to simply as PMAX), which is applied to a reference input of the write DAC 332. The write DAC 332 can be a multiplier type DAC, with PMAX specifying a multiplication factor. More specifically, the output of the write DAC 332 can be proportional to a multi-bit digital write value (applied by one of the write registers 338) multiplied by the reference input (i.e., PMAX). For example, the output of the write DAC 332 may equal the product of the multi-bit digital input value (from one of registers 338), multiplied by PMAX, further multiplied by a reference determined RSET and ISLOPE. The contents of the write registers 338 and the PMAX register 334 can be updated by the controller 102 via the serial interface 318 and SER bus 319.

An oscillator channel, also known as the high frequency modulation (HFM) channel, is shown as including an oscillator (OSC) DAC 372, which can output various levels in an oscillating manner. In the embodiment shown, the input to the OSC DAC 372 is the output of a plurality of parallel AND gates 365. Each AND gate 365 receives the output of oscillator 359 and an output of an oscillator amplitude selection circuit 360. An oscillator frequency DAC 352, a spread spectrum (SS) frequency DAC 354 and a SS amplitude DAC 356 all receive a digital input, respectively, from registers 351, 353 and 355. The controller, via the serial interface 318 and the SER bus 319, can update the contents of the registers 351, 353 and 355. The register 351 and oscillator frequency DAC 352 are used to specify the frequency of the oscillator 359. The register 353 and SS frequency DAC 354 are used to specify the frequency of an SS oscillator 357, and the register 355 and SS amplitude DAC 356 are used to specify an amplitude of the SS oscillator 357. The spread spectrum output of the SS oscillator 357 is added to the output of the oscillator frequency DAC 352 by summer 358, to thereby spread the harmonics generated by the oscillator channel. The oscillator amplitude circuit 360 consists of two registers 361, 362 and a selector 363. The WSG bus 317 includes one or two timing lines used to select one of these two registers via selector 363, according to the write strategy programming. The WSG bus 317 also has some timing lines to control the mode of the oscillator 359. The oscillator can be low, high, or oscillating due to the control from the WSG bus 317. Therefore, as instructed by the WSG 316, the oscillator 359 can be made to output zero, the value of OSC-LO 362 as a DC term, or the value of OSC-HI 361 as either a DC term or an oscillating term.

The contents of control registers 340 can also be updated by the controller 102 via the serial interface 318 and SER bus 319. For instance, the control registers 340 may contain bits to enable the read, write, and oscillator channels. The control registers 340 may also contain control bits to select which of several Iout pins is active. The control registers 340 may also have separate enable bits for a phase lock loop (PLL). The control registers 340 may also have various mode bits for various functions.

Figure 4:
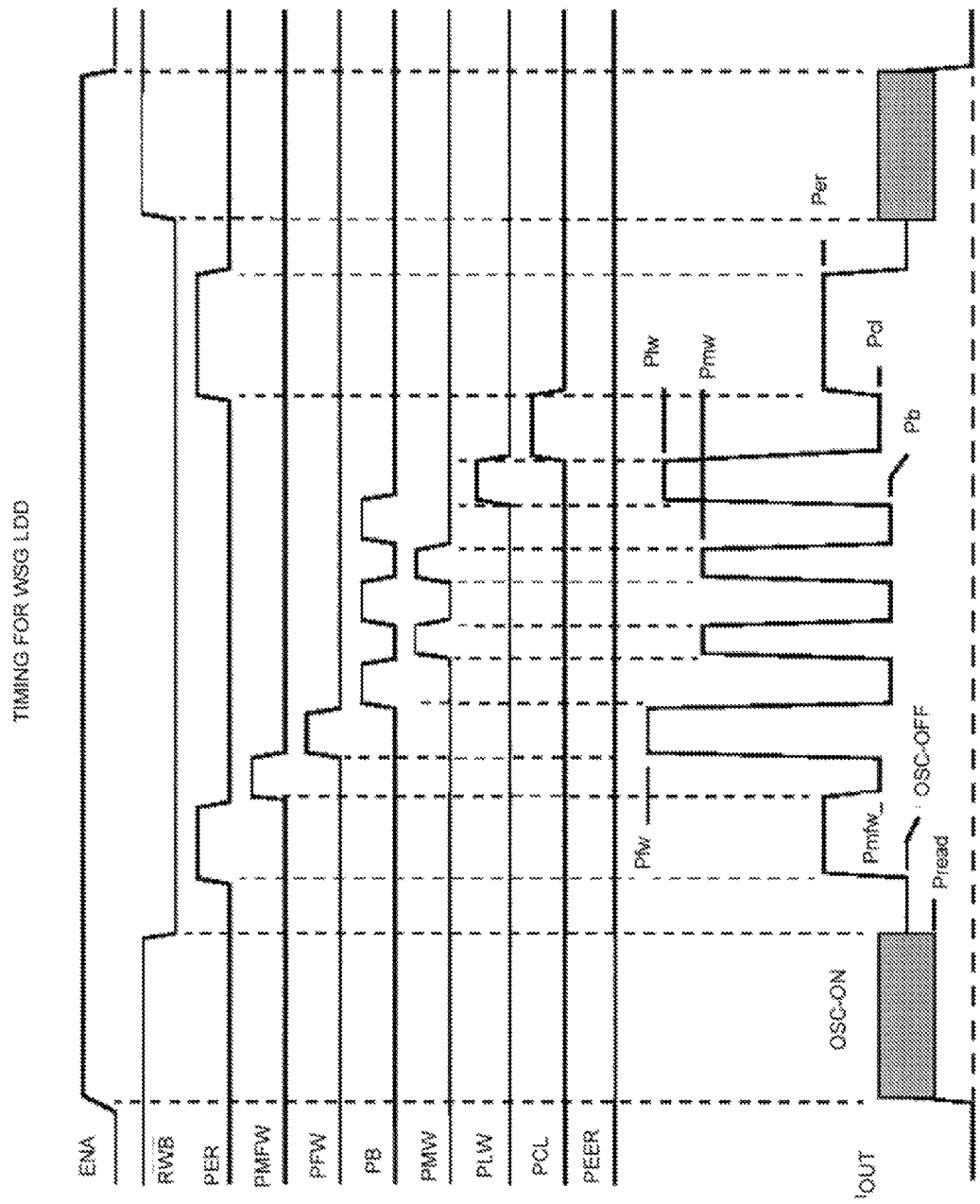
FIG. 4 is an exemplary timing diagram for the WSG LDD of FIG. 3.

The exemplary timing diagram shown in FIG. 4 illustrates how the various output levels for $I_{OUT}$ can be generated using the WSG LDD 310. As can be appreciated from FIG. 4, the WSG LDD 310 has the ability to send one of many digital values to the input of the write DAC 332. Although it is possible that the control lines to select the write registers 338 could have timing errors, they can be minimized because the entire timing problem is confined to one piece of silicon. In contrast, in the conventional LDD 110, the timing involves the controller 102, the flex cable 104, and the LDD 110, thereby increasing the variation in delays between the channels. Also, the WSG LDD 310 does not require an additional analog line and/or a digital line (or pair) for every output current level supported. Thus, the pin count for the WSG LDD 310 can be kept the same as the number of output current levels supported increases. Further, since most signals sent from the controller 102 to the WSG LDD 310 are digital, the signals are less susceptible to noise, leading to higher fidelity waveforms. Further, the WSG LDD 310 can more easily support high speeds, e.g., 16× DVD speeds, because the filtering effect of the flex on the control signals does not directly limit the timing fidelity. However, while the WSG LDD 310 solves many of the problems of the conventional LDD 110, the WSG LDD 310 include large amounts of complex digital circuits, which may add cost and test time to their production. Additionally, such circuits cause the power consumption and heat output of the WSG LDD 310 to be higher than that of the conventional LDD 110. Further, many OPU users/customers do not want to make a significant change from their conventional controller and LDD solutions. For the above reasons, hybrid type LDDs are provided herein.

Figure 5A:
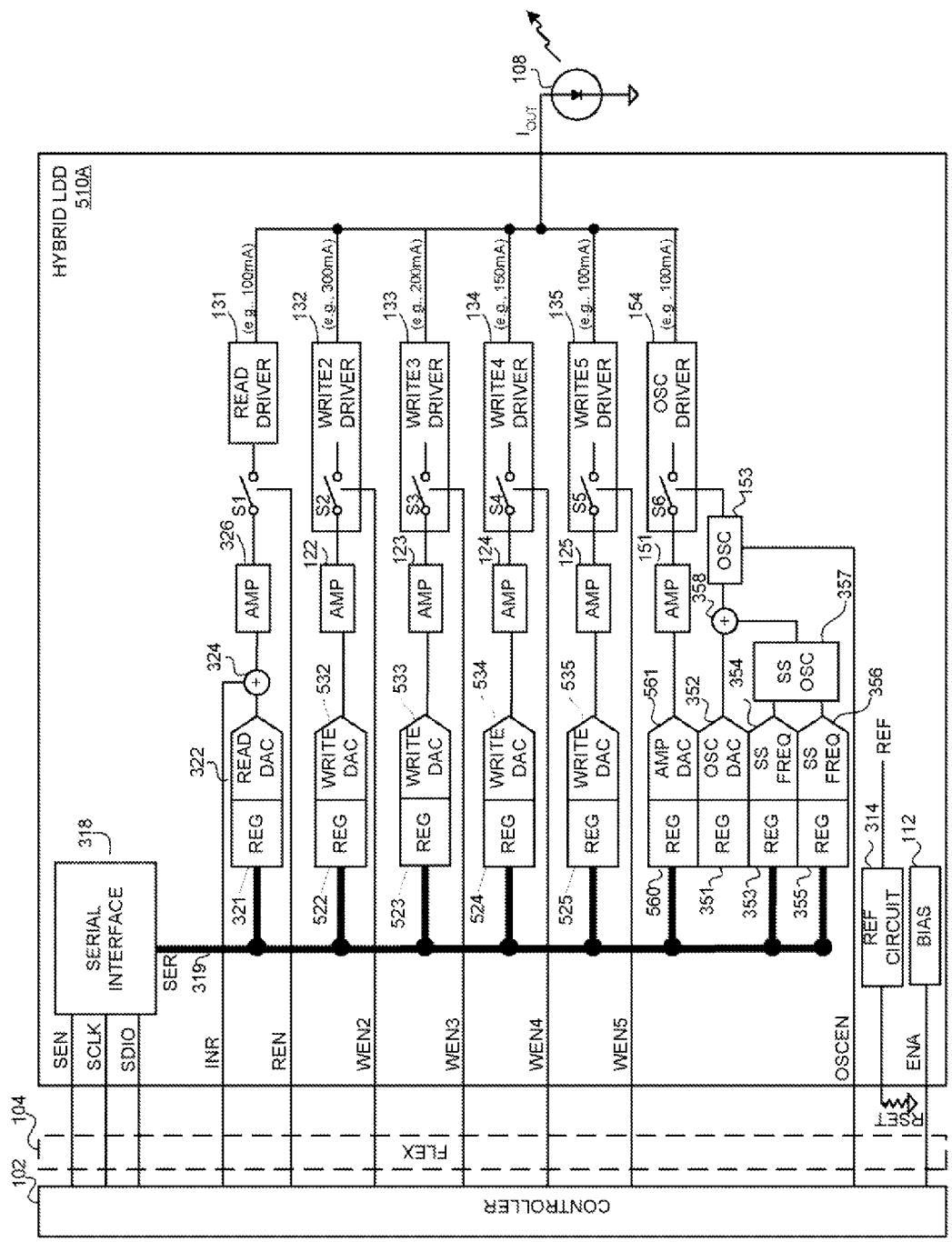
FIG. 5A is a high level block diagram of an exemplary hybrid LDD.

An exemplary type of hybrid LDD 510A is shown in FIG. 5A. This hybrid LDD 510A accepts conventional read, write and oscillator inputs (INR, REN, WEN2-WEN5 and OSEN) from the controller 102, and includes a conventional read driver 131, conventional write drivers 132-135 and a conventional oscillator driver 154. However, the hybrid LDD 510A differs from the conventional LDD 110 because it includes a serial interface 318, a SER bus 319, a reference circuit 314, a register 321 and read DAC 322 for the read channel, and further registers (351, 353, 355), DACs (352, 354, 356) and an SS oscillator 357, which are typically included in a WSG LDD (e.g., see FIG. 3). Additionally, the hybrid LDD 510A includes a register (522, 523, 524 and 525) and a write DAC (532, 533, 534 and 535) for each write channel, none of which are provided in the conventional LDD 110. Also, the hybrid LDD 510A includes an amplitude register 560 and a DAC 561 for controlling the amplitude of the signal produced by the oscillator channel.

In the embodiment of FIG. 5A, to control the amplitude of the outputs produced by the read channel and the multiple write channels, the controller 102 can update the various amplitude registers (e.g., 321, 522-525 and 560) by sending such updates over the SDIO line to the serial interface 318, which communicates with the various registers via the SER bus 319. Accordingly, the controller 102 no longer needs to send analog input lines (e.g., INR-IN5), which are susceptible to noise, across the flex cable 104. Similarly, to control the amplitude and frequency of the signal produced by the oscillator channel, the controller 102 can update the various amplitude and frequency registers (e.g., 351-355 and 560) by sending such updates over the SDIO line. Thus, to adjust the amplitude and frequency of the oscillator channel, there is no need to place/adjust RAMP and RFREQ resistors on the OPU. The hybrid LDD 510A also includes spread spectrum capabilities within the LDD. It is possible that a conventional LDD could have these SS capabilities. However, in the conventional LDD the SS frequency and amplitude would be adjusted with resistors instead of DAC's. It is also possible that the read and write registers and DAC's are removed and replaced with the IIN lines of a conventional LDD, and that the serial interface is only used to control the oscillator.

The hybrid LDD 510A differs from the WSG LDD 310 (see FIG. 3) in that the controller still controls the timing of the read, write and oscillator channels using timing enable lines (e.g., REN, WEN2-WEN5 and OSCEN). In other words, the controller 102 can use similar timing to control the timing of the $I_{OUT}$ signal of the hybrid LDD 510A as it used to control the timing of the $I_{OUT}$ signal of the convention LDD 110. A comparison between the hybrid LDD 510A and the conventional LDD 110 also reveals that the hybrid LDD uses the enable lines in a similar manner, i.e., to control switches associated with the various read and write drivers 131-135. Further, a WSG is not implemented in the hybrid LDD 510A. This may reduce the cost, testing, heat output and complexity of the hybrid LDD 510A, as compared to the WSG 310. For the above reasons, an OPU user/customer may find the hybrid LDD 510A desirable, if that user/customer does not want to make significant changes to their conventional LDD solution, yet wants to reduce the pin count and/or number of analog lines sent over the flex cable 104.

Figure 5B:
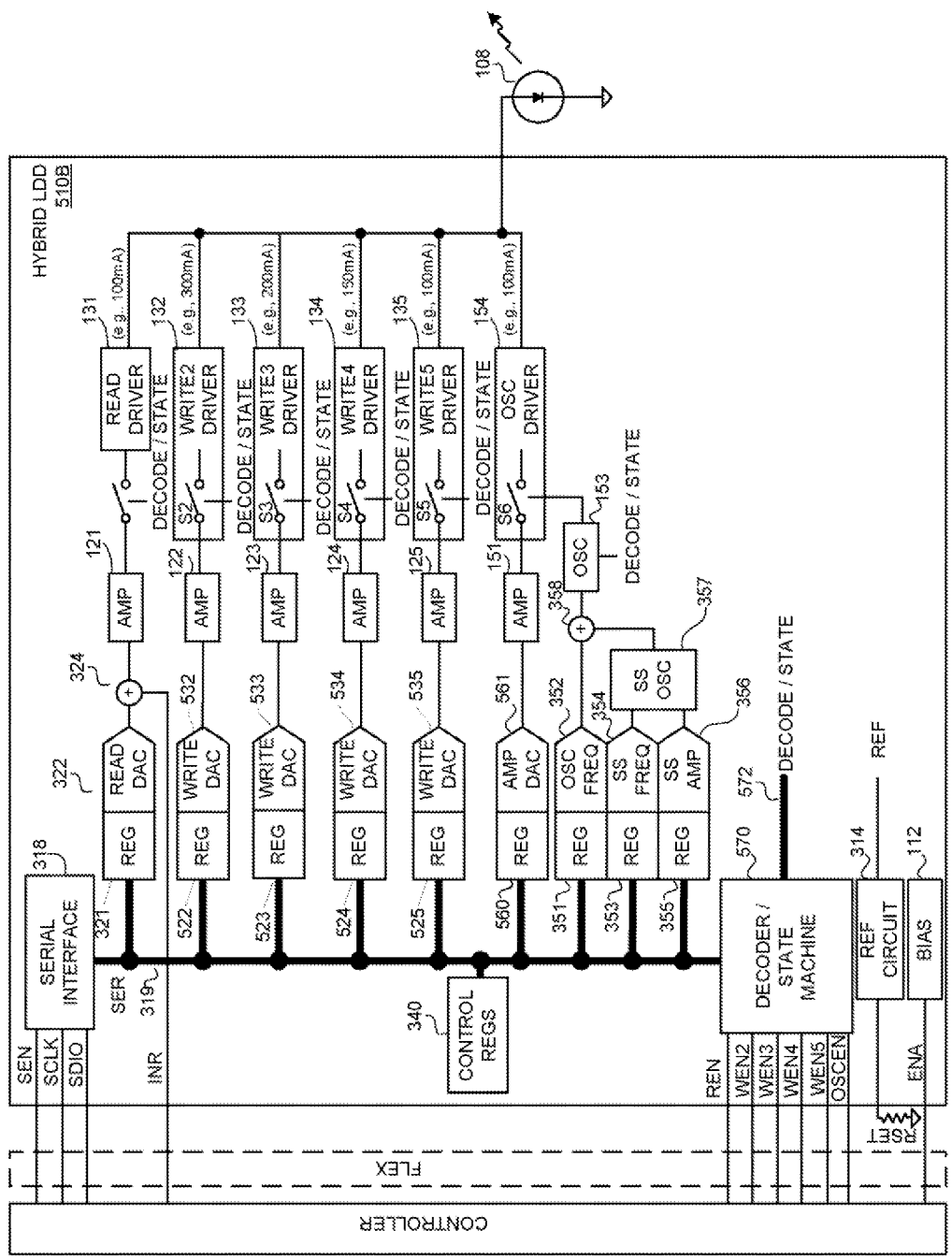
FIG. 5B is a high level block diagram of a hybrid LDD, according to an embodiment of the present invention.

A hybrid LDD 510B, according to an embodiment of the present invention, is shown in FIG. 5B. This hybrid LDD 510B accepts conventional read, write and oscillator inputs (INR, REN, WEN2-WEN5 and OSCEN) from the controller 102, and includes a conventional read driver 131, conventional write drivers 132-135 and a conventional oscillator driver 154, as was the case with the hybrid LDD 510A. However, rather than using these enable lines to control switches within the read, write and oscillator channels directly, the read and write enable lines (REN and WEN2-WEN5), and the OSCEN line are provided to a decoder 570. The decoder 570 outputs various timing signals on the decoder bus 572 to thereby control the various switches of the various read, write and oscillate channels. For example, the decoder 570 may controls the switch S1 of the read channel based on the ENR line or serial signal, or a decode of the WEN signals received from the controller 102. Similarly, the decoder 570, based on the WEN2-WEN5 lines, may control the switches S2-S5 of the write channels in a manner different than as in a conventional LDD. Further, the decoder controls the switch S6 of the oscillator channel based on the OSCEN line or REN and WEN lines.

A timing diagram for the hybrid LDDs 510A are essentially the same as the timing diagram of FIG. 2, which as described above is the timing diagram for the conventional LDD 110. This is because the same timing signals are used for the hybrid LDDs 510A as were used for the conventional LDD 110, with each write enable signal essentially controlling the timing of a separate write channel. Thus, while there are certain advantages of the hybrid LDDs 510A over the conventional LDD 110, the hybrid LDDs 510A may suffer from some of the same problems as the conventional LDD 110. For example, for the hybrid LDD 510A, the timing control is identical to the conventional LDD 110, and it will therefore have the same timing errors as the conventional LDD 110. However for the hybrid LDD 510B, the definition of how the WEN lines control the outputs can be changed, and thereby modify and potentially improve upon the timing of the conventional LDD 110. An advantage of the hybrid LDDs 510A and 510B over the conventional LDD 110 is that less analog signals are sent from the controller 102 across the flex cable 104 to the hybrid LDDs. More specifically, the hybrid LDDs 510A and 510B do not rely on analog write level (i.e., amplitude control) signals IN2-IN5 from the controller 102, nor do they need numerous pins and resistors to control the oscillator frequencies and amplitudes. Rather, amplitude levels for the various channels are controlled using registers that are populated and updated by the controller 102 using the SDIO line, the serial interface 318 and the SER bus 319. This reduction of analog signals sent over the flex cable 104 should improve signal fidelity, and reduce pin count.

The hybrid LDD 510B has many advantages over the hybrid LDD 510A. For example, with the hybrid LDD 510B, less wires or traces of the flex cable 104 may be used for accepting the same amount of WEN signals as compared to the hybrid LDD 510A. For example, to accept eight WEN signals, the hybrid LDD 510B may only require three WEN lines of the flex, where the hybrid LDD 510A would require eight. Additionally, with the hybrid LDD 510B, further write power levels can be added without adding further WEN signal lines to the flex, which is not the case for hybrid LDD 510A. Also, as just explained above, while the LDD 510A may produce the same timing errors as the conventional LDD 110, with the hybrid LDD 510B the definition of how the WEN lines control the outputs can be modified to avoid such errors.

Figure 6:
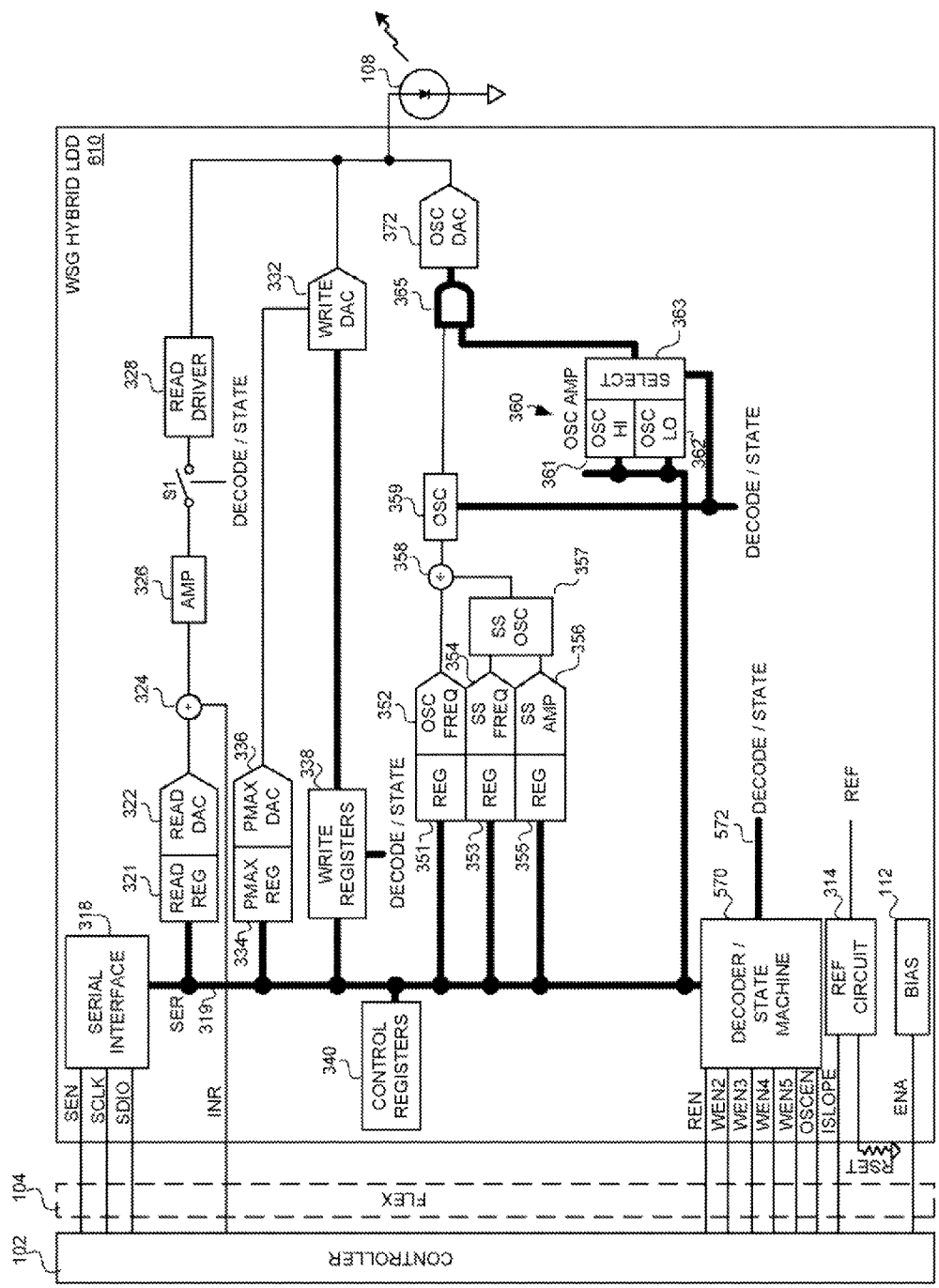
FIG. 6 is a high level block diagram of another hybrid LDD, referred to as a WSG hybrid LDD, according to an embodiment of the present invention.

FIG. 6 illustrates a hybrid LDD 610 according to another embodiment of the present invention. Like the hybrid LDD 510B, the hybrid LDD 610 includes a decoder 570 that receives the various read, write and oscillate enable lines (REN, WEN1-WEN5 and OSCEN) from the controller 102. Additionally, the hybrid LDD 610B includes a serial interface 318 which enables the controller to update the registers within the LDD 610 by sending serial data over the SDIO line. However, a difference between the hybrid LDD 610 and the hybrid LDD 510B is that the remaining components of the hybrid LDD 610 more resemble the WSG LDD 310, rather than the conventional LDD 110. Accordingly, the hybrid LDD 610 may be referred to as a WSG hybrid LDD 610, because it accepts conventional enable inputs (also referred to as timing inputs), yet internally functions similar to the WSG LDD 310. The significant similarity between the WSG hybrid LDD 610 and the WSG LDD 310 (described with reference to FIG. 3) is that they both have only one write channel (with one write DAC 336), rather than requiring one write DAC per write channel (e.g., as FIGS. 5A and 5B). Preferably, the decoder 570 of the WSG hybrid LDD 610 translates the various WEN signals such that only one write DAC register 338 is enabled at a time. However, if the decoding simply emulates a conventional LDD, the hybrid LDD will suffer the same type of timing glitch problem as the conventional LDD. However, it is possible to decode the WEN lines in such a way that glitch errors are decreased or even eliminated.

The timing diagram for the hybrid WSG LDD 610 will resemble the timing diagram of FIG. 4, which as described above is the timing diagram for the WSG LDD 310. Referring to FIG. 6, the decoder 570 of the hybrid WSG LDD 610 receive the various enable timing signals REN, WEN2-WEN5 and OSEN from the controller 102. If the decoder emulates a conventional LDD, then based on the REN signal, the decoder 570 controls the switch S1 of the read channel using the decode bus 572. If the decoder emulates a conventional LDD, then based on the WEN2-WEN5 signals, the decoder 570 controls the timing and amplitude of the output of the write channel by selectively providing digital values from the write registers 338 to the write DAC 332, using the decode bus 572. If the decoder emulates a conventional LDD, then based on the OSCEN signal, the decoder 570 controls the oscillator 359 and the selector 363 of the oscillator channel, using the decode bus 572. However, the decoder need not emulated a conventional LDD. For example, the decoder 570 may be altered to only accept the ENA line, and several WEN lines, eliminating the REN and OSCEN line, and possibly one or more WEN lines. Also, as will be described below, the decoder 570 can be configured to convert gray coded inputs into outputs which are used to control the various output channels. If gray codes are used on the WEN lines, the controller 102 may need to be modified to match the decoding done in the decoder 570.

The WSG hybrid LDD 610 will allow for many of the benefits of the WSG LDD 310, yet will allow users/customers to continue to use of their conventional timing signals. Additionally, the WSG hybrid LDD 610 will enable users/customers to maintain much of the write strategy control within the controller 102. By providing a flexible decoder, i.e., a decoder that can be modified via the SER bus 319, the WSG type of hybrid can offer a migration path as the user programs the controller 102 differently, or modifies the controller hardware to take advantage of the improved decoder possibilities.

Figure 7:
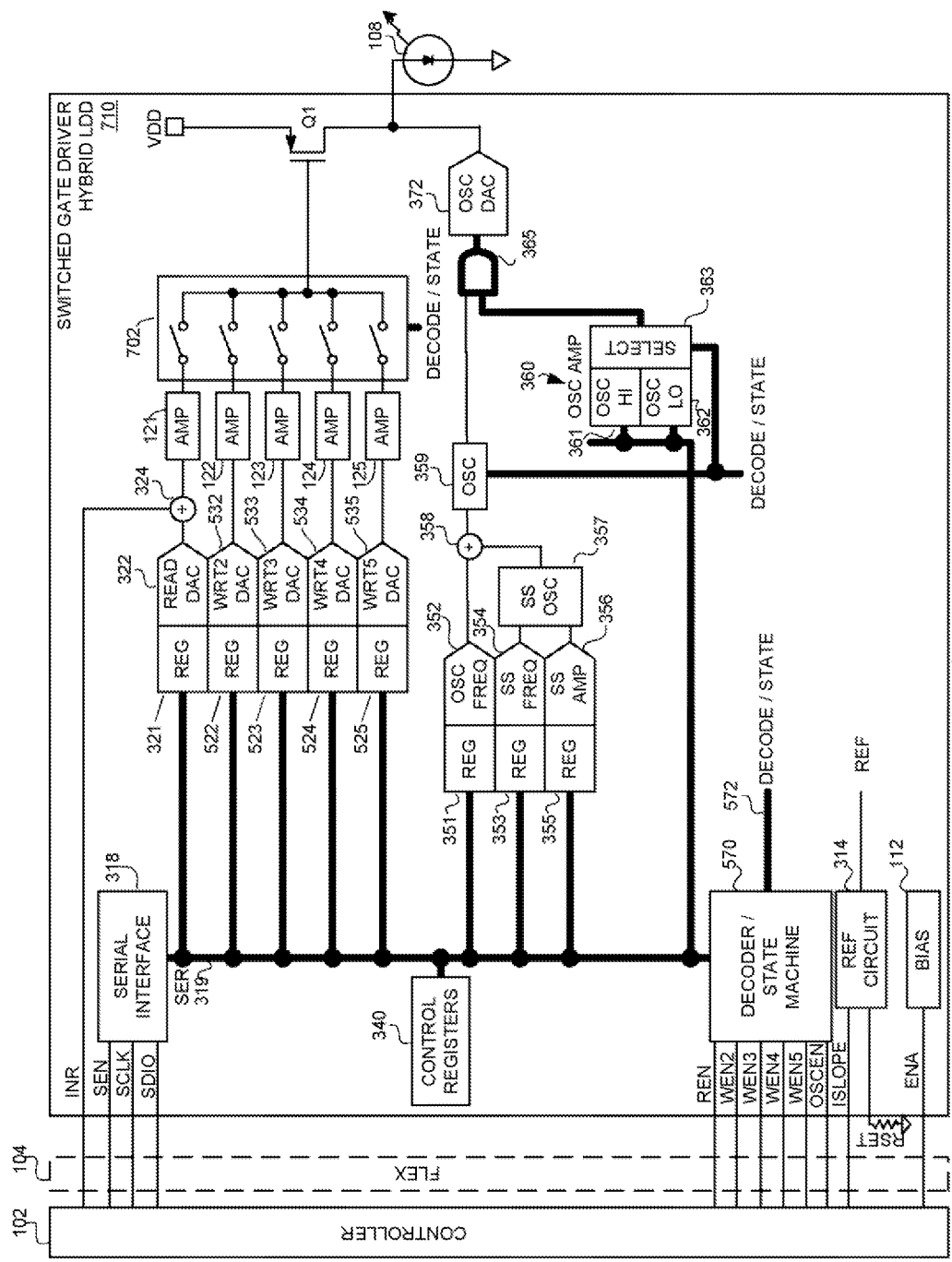
FIG. 7 is a high level block diagram of a further hybrid LDD, referred to as a switched gate hybrid LDD, according to another embodiment of the present invention.

The further hybrid LDD 710 shown in FIG. 7 includes a selection switch 702 that connects the output of one of DACs 322, 532, 533, 534 and 535 to the control terminal (i.e., gate or base) of a transistors Q1. An amount of current flowing through the current path (i.e., the source-drain path or emitter-collector path) of the transistor Q1 is controlled by the voltage provided to the control terminal (i.e., gate or base) of a transistors Q1. The switch 702 is controlled by the decoder 570 using the decode bus 572. Although the details are not shown, the circuits from the DACs (322 and 532-535) and the amplifiers (121 to 125) may be configured so that the control voltages supplied to the gate of Q1 are such to produce drain currents in Q1 that are proportional to the register values (321 and 522-525). In this embodiment the different digital values stored in the different amplitude registers 321 and 522-525 are used to provide required voltage levels to the gate (or base) of transistor Q1, to thereby produce the desired different levels for $I_{OUT}$. In this embodiment, there the registers 321 and 522-525, DACs 322 and 532-535, amplifiers 121-125, switch 702 and transistor Q1 can be considered to be part of a read/write channel. The output of the oscillator channel, which operates the same as in the embodiment of FIG. 6, is added to the current produced by transistor Q1 (i.e., the current produced by the read/write channel), to thereby drive the laser diode 108. It is also possible in this configuration that the read channel have a separate driver as in FIGS. 5 and 6.

Figure 8:
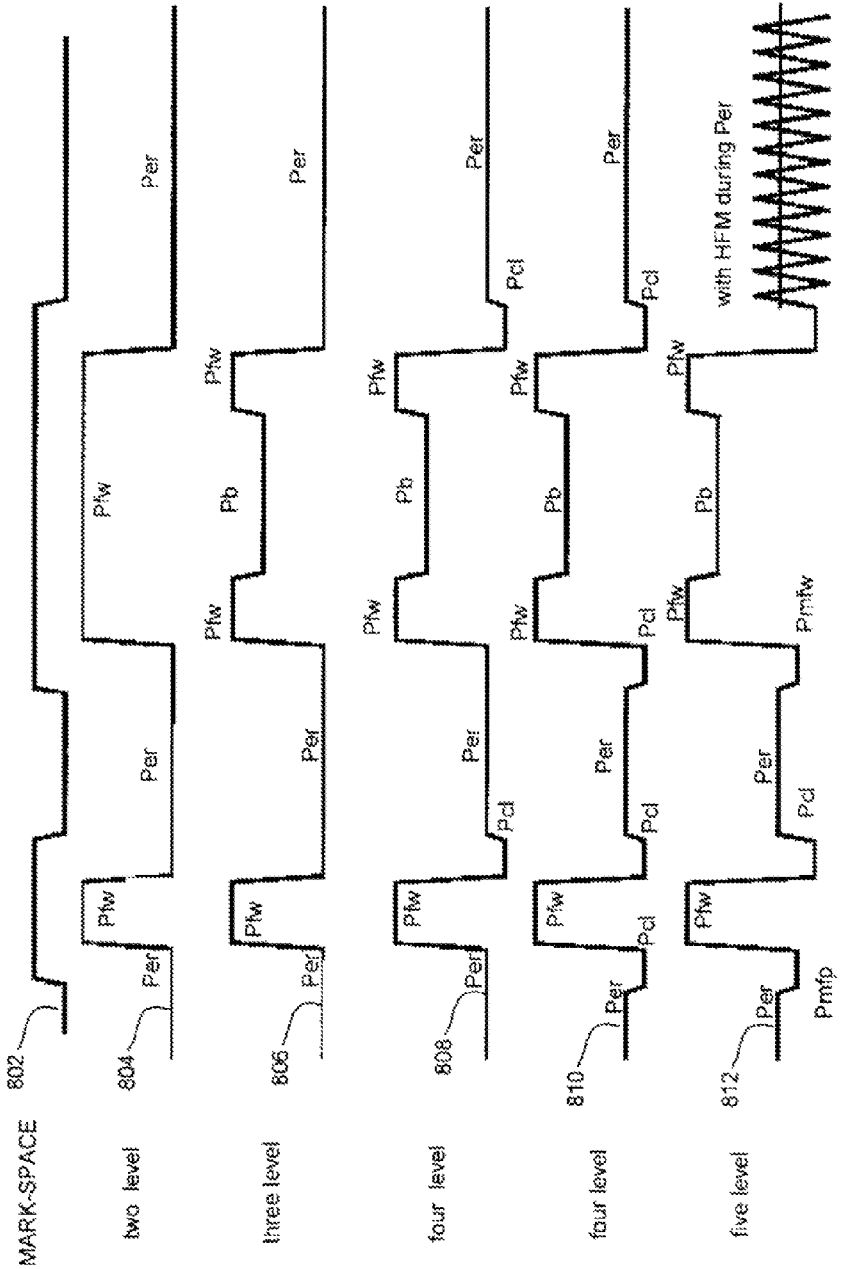
FIG. 8 illustrates various exemplary $I_{OUT}$ signals that can be generated for an arbitrary mark-space signal that is used for writing to a type R media.

FIG. 8 illustrates various exemplary $I_{OUT}$ signals that can be generated for an arbitrary mark-space signal 802 that is used for writing to a type R media (record once media). Signal 804 includes only two different levels, a Per (Power Erase) level and a Pfw (Power First Write) for writing. Signal 806 includes three different levels, including a Pfw level and a Pb (Power Bias) level for writing the a Per level. Signals 808 and 810 include four levels, including Pfw and Pb levels for writing, a Per level, and a Pcl (Power Cool) level for cooling the media. Signal 812 includes five different levels, including Pmfp (Power Middle first Pulse), Pfw and Pb levels for writing, a Per level and a Pcl level. The right most portion of signal 812 also shows the oscillator output added to the Per level.

Figure 9:
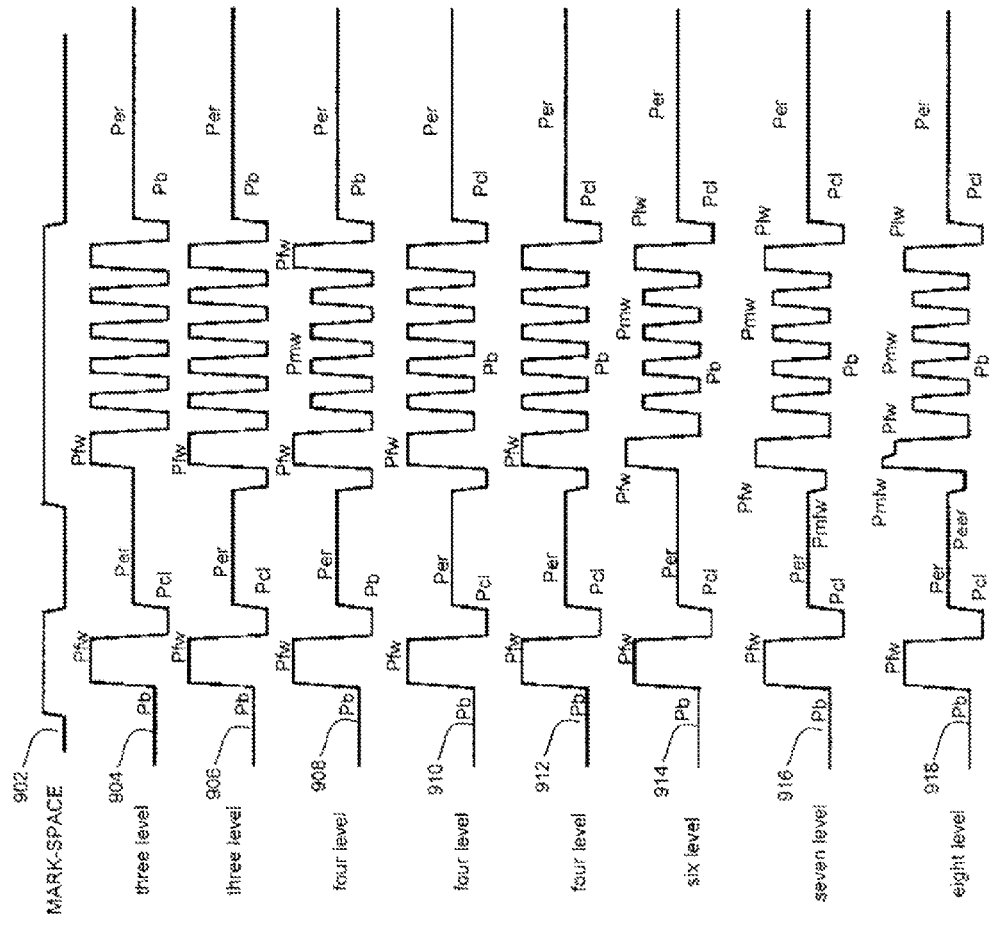
FIG. 9 illustrates various exemplary $I_{OUT}$ signals that can be generated for an arbitrary mark-space signal that is used for writing to a type RW media.

FIG. 9 illustrates various exemplary $I_{OUT}$ signals that can be generated for an arbitrary mark-space signal 902 that is used for writing to a type RW media (re-writeable media). Signals 904 and 906 includes three different levels, including Pfw and Pb levels for writing the a Per level. Signals 908, 910 and 912 include four levels, including Pfw, Pb and Pmw (Power Middle Write) levels for writing, a Per level, and a Pcl level. Signal 914 includes six levels, including Pfw, Pb, Pmw and Plw (Power Last Write) levels for writing, a Per level, and a Pcl level. Signal 916 includes seven levels, including Pfw, Pmfw, Pb, Pmw and Plw levels for writing, a Per level, and a Pcl level. Signal 918 includes eight levels, including Pfw, Pmfw, Pb, Pmw, and Plw levels for writing, a Per level, a further erase level Peer, and a Pcl level.

Regardless of the specific write strategy being used, an LDD will typically also need to produce a Power Read (Pread) level, which is used for reading, and an off level. The Pread level can be, e.g., between the off level and the Per level, but need not be. In some cases the read level will be composed of a read current and the oscillator-off level.

In the hybrid LDDs discussed above with reference to FIGS. 5-7, the various enable lines (e.g., REN, WEN2-WEN5 and OSCEN) are used to control the timing of the $I_{OUT}$ signal. For example, assume that WEN2 high, with WEN3-5 low (i.e., WEN2-WEN5 is 1000), were used to produce the Per write level; and that WEN3 high, with WEN2, WEN4 and WEN5 low (i.e., WEN2-WEN5 is 0100), were used to produce the Pfw write level. Now also assume that a write strategy may results in a transition from the Per level to the Pfw level, as occurs in exemplary $I_{OUT}$ signals 804, 806 and 808 in FIG. 8. When changing WEN2-WEN5 from 1000 to 0100, two bits (i.e., the WEN2 and WEN3 bits) change. If those two bits don't change simultaneously, then the hybrid LDDs will experience timing glitch problems. For example, if WEN2 transitions from 1 to 0 before WEN3 transitions from 0 to 1, then the hybrid LDD will briefly receive a 0000 on lines WEN2-WEN5, and briefly produce an incorrect $I_{OUT}$ signal based thereon. For another example, if WEN2 transitions from 1 to 0 after WEN3 transitions from 0 to 1, then the hybrid LDD will briefly receive a 1100 on lines WEN2-WEN5, and briefly produce an incorrect $I_{OUT}$ signal based thereon.

More generally, it is noted that timing glitch problems may occur if more than one of the inputs enable timing inputs are required to change state at the same time. This is because if they do not change states at the exactly same time, there will be some unpredictable state that occurs before both inputs change to the desired state.

To avoid such problems, specific embodiments of the present invention take advantage of the principles of gray codes, which are codes where only one bit changes from one state to the next. Accordingly, before describing such embodiments it is first useful to briefly provide some exemplary gray code transitions diagrams, and to discuss some properties associated with gray coding. First, since only one bit can be changed at a time, there are only n possible changes for an n bit word. If gray codes are not used, there are $2^n-1$ changes possible. Thus, many change possibilities are given up when following gray codes. Second, any code word can be changed to any other code word in only n steps or less. This is what the levels refer to in the following diagrams. Another restriction of gray codes is that a loop through a diagram also occurs in an even number of steps. This is significant in using gray codes for write strategies because some strategies loop in an odd number of steps. In this case, an extra 'do-nothing' step must be inserted into the write strategy. Although the use of gray codes eliminates the occurrences of 'glitches' at transitions, it does not eliminate timing differences between the various WEN timing lines. Thus timing errors may still occur, but they no longer produce unwanted drops or surges (glitch) in power at the time of transition.

Figure 10C:
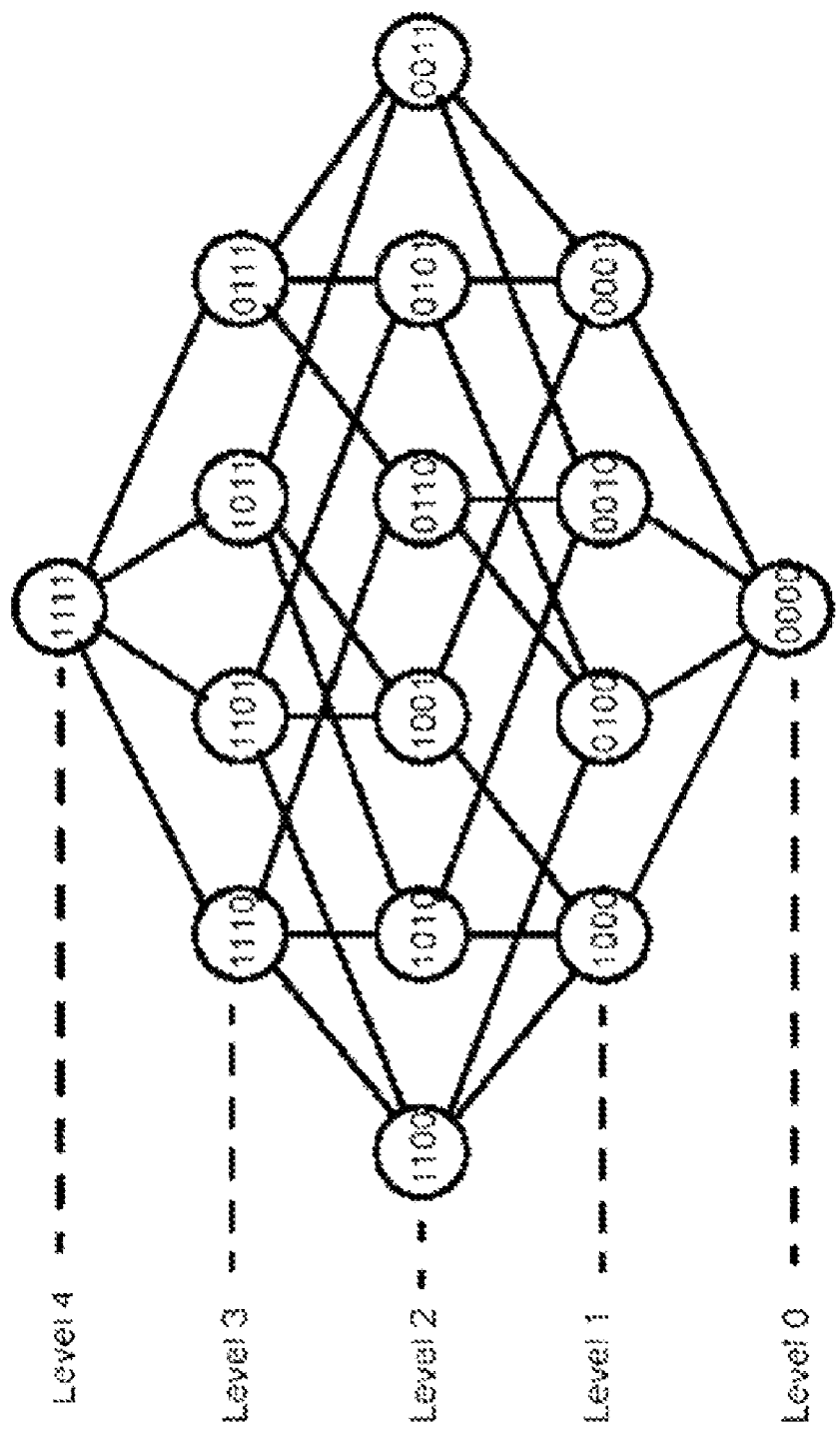
FIG. 10C illustrates an exemplary four bit gray code transition diagram.

FIG. 10A illustrates an exemplary two bit gray code transition diagram, which includes three levels (level 0, level 1 and level 2). Only 1 bit is changed when following the solid lines shown in the diagram. It can be appreciated from FIG. 10A that there can be a transition from any state to any other state in 2 steps or less. FIG. 10B illustrates an exemplary three bit gray code transition diagram, which includes four levels (level 0, level 1, level 2 and level 3). Again, only 1 bit is changed when following the solid lines shown in the diagram. It can be appreciated from FIG. 10B that there can be a transition from any state to any other state in 3 steps or less. FIG. 10C illustrates an exemplary four bit gray code transition diagram, which includes five levels (level 0, level 1, level 2, level 3 and level 4). Again, only 1 bit is changed when following the solid lines shown in the diagram. It can be appreciated from FIG. 10C that there can be a transition from any state to any other state in 4 steps or less.

Figure 11A:
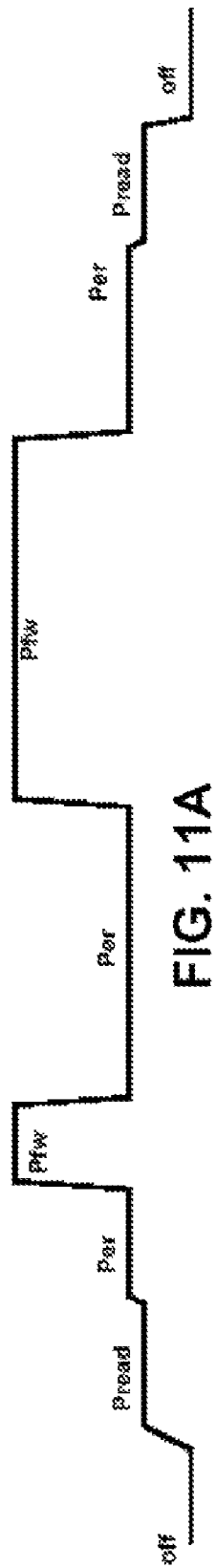
FIG. 11A illustrates an exemplary $I_{OUT}$ signal including four different states.

Referring now to FIG. 11A, an exemplary $I_{OUT}$ signal is shown as including four different levels, including an off level, a Pread level, a Per level and a Pfw level. From the off level there can be a transition to the Pread level. From the Pread level there can be a transition to the Per level or the off level. From the Per level there can be a transition to the Pfw level or the Pread level. From the Pfw level there can only be a transition to the Per level.

If using conventional encoding, then two WEN lines (e.g., WEN2 and WEN3) are required, and, Pfw=11, Per=01, and Read is independent. In this simple 2 level write power glitches can be avoided unless Pfw=01, and Per=10.

Figure 11B:
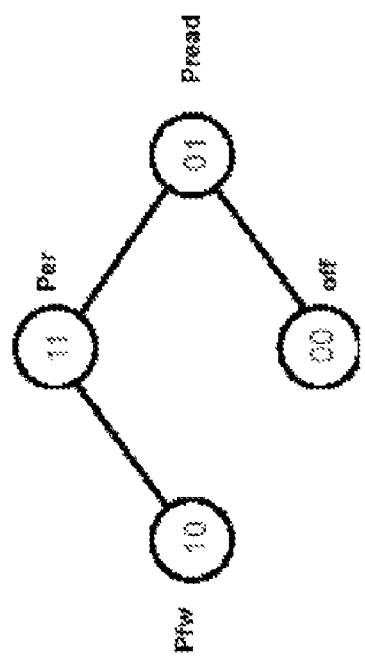
FIG. 11B is a gray code transition diagram that shows how one bit can be changed at a time to transition from any of the $I_{OUT}$ levels shown in FIG. 11A to a next level.

Using certain embodiments of the present invention, such timing glitch can be avoided, and one fewer enable lines can be used. For the example discussed with reference to FIGS. 11A and 11B it can be assumed that the ENA line equals 1 for a non-off condition, and 0 for an off condition. It is also assumed that Pread is different than Per, in case the oscillator would be on during Pread, but off during Per. Were this the case, since only four total $I_{OUT}$ levels (i.e., off, Pread, Per and Pfw) are needed, then only two enable lines (e.g., WEN2 and WEN3) are necessary, in addition to the chip enable (ENA) line. Disregarding the ENA line (because it is assumed always be 1 when the $I_{OUT}$ is not off), the WEN2 and WEN3 inputs can be 00 for the off level, 01 for the Pread level, 11 for the Per level and 10 for the Pfw level. As can be appreciated from FIG. 11B, such a mapping of gray codes to possible levels results in no more than one bit changing at a time, thereby preventing the glitch problems mentioned above, and one less control line is used (e.g., REN is not necessary).

Figure 12A:
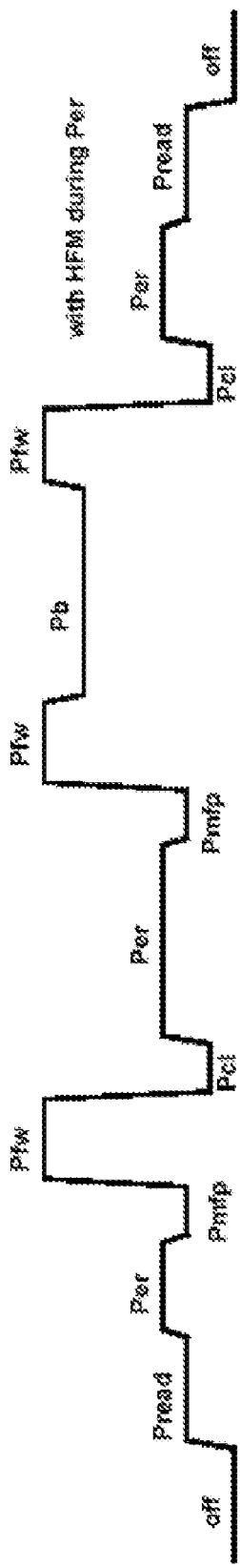
FIG. 12A illustrates an exemplary $I_{OUT}$ signal including seven different states.
Figure 12B:
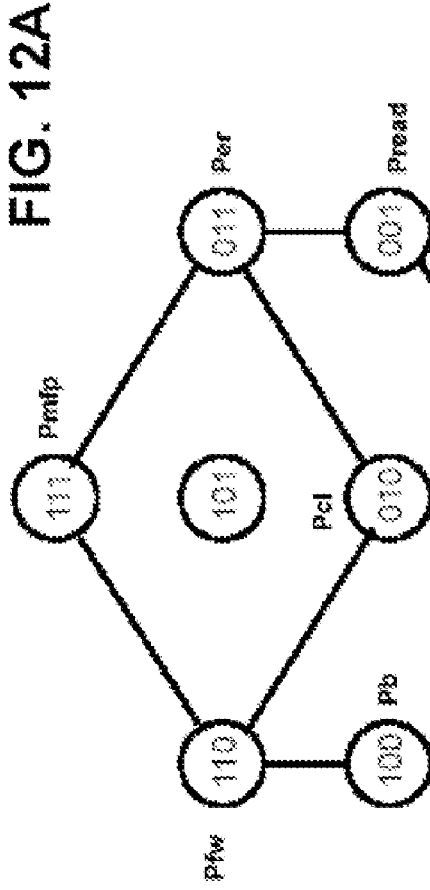
FIG. 12B is a gray code transition diagram that shows how one bit can be changed at a time to transition from any of the $I_{OUT}$ levels shown in FIG. 12A to a next level.

A slightly more complex example is now discussed with reference to FIGS. 12A and 12B. Referring to FIG. 12A, an exemplary $I_{OUT}$ signal is shown as including seven different levels, including an off level, a Pread level, a Per level, and Pmfp level, a Pfw level, a Pcl level and a Pb level. For the off level, there can be a transition to the Pread level. From the Pread level, there can be a transition to the Per level or to the off level. From the Per level, there can be a transition to the Pmfp level or the Pread level. From the Pcl level, there can be a transition to the Per level. From the Pfw level, there can be a transition to the Pcl level or the Pb level. From the Pmfp level, there can be a transition to the Pfw level. From the Pb level, there can only be a transition to the Pfw level.

For the example discussed with reference to FIGS. 12A and 12B it can be assumed that the ENA line equals 1 for a non-off condition, and 0 for an off condition. It is also assumed that Pread is different than Per, in case the oscillator could be on during Pread, but off during Per. Were this the case, since seven total levels (i.e., off, Pread, Per, Pcl, Pmfp, Pfw and Pb) are needed, then only three enable lines (e.g., WEN2, WEN3 and WEN4) are necessary, in addition to the chip enable (ENA) line. Disregarding the ENA line (because it is assumed to always be 1 when the $I_{OUT}$ is not off), the WEN2, WEN3 and WEN4 inputs can be 000 for the off level, 001 for the Pread level, 011 for the Per level, 010 for the Pcl level, 010 for the Pfw level, 100 for the Pb level and 111 for the Pmfp level. As can be appreciated from FIG. 12B, such a mapping of gray codes to possible levels results in no more than one bit changing at a time, thereby preventing the glitch problems mentioned above.

If the same write strategy were to be implemented with a conventional LDD, five WEN lines would be required in addition to REN and OSCEN. Thus, it can be seen that gray coding not only eliminates the timing glitch problem but significantly increases the number of write states that can be achieved for a limited number of control lines.

An even more complex example is now discussed with reference to FIGS. 13A-13C. Referring to FIG. 13A, an exemplary $I_{OUT}$ signal is shown as including nine different levels, including an off level, a Pread level, a Per level, a Pmfp level, a Pfw level, a Pcl level, a Pb level, a Plw level and a Pmw level. From the off level, there can be a transition to the Pread level. From the Pread level, there can be a transition to the Per level or to the off level. From the Per level, there can be a transition to the Pmfp level or the Pread level. From the Pcl level, there can be a transition to the Per level. From the Pfw level, there can be a transition to the Pcl level or the Pb level. From the Pmfp level, there can be a transition to the Pfw level. From the Pb level, there can be a transition to the Plw level or the Pmw level. From the Plw level, there can be a transition to the Pcl level. From the Pmw level, there can only be a transition to the Pb level.

Referring to FIG. 13B, it can be assumed that the ENA line equals 1 for a non-off condition, and 0 for an off condition. The gray code transition diagram of FIG. 13B shows how four enable lines (WEN2, WEN3, WEN4 and WEN5), in addition to the ENA line, can be used to ensure that only one bit changes at a time, regardless of the transition. The example of FIG. 13A goes beyond the capability of using the three enable lines WEN2, WEN3 and WEN4. And thus, FIG. 13B showed how the fourth write enable line WEN5 can be used.

Here the capability of 3 WEN control lines is exceeded, since there are only 8 states available with 3 WEN lines, but there are 9 current output states. However, if an extra serial bit or REN line, or ENA, or RWB was used to go from off to Pread, the three WEN lines for write would be sufficient. Examining the three timing enable line case, the three enable lines WEN2, WEN3 and WEN4 can be used if there is the condition that Pread is always high when ENA is active, or a serial REN line or bit enables read, or a RWB line or bit, is used to move the state from off to Pread. This is illustrated in the gray code transition diagram of FIG. 13C. In other words, in FIG. 13C the same write strategy as for FIG. 13A is attempted with one less write timing control bit (as compared to in FIG. 13B). Notice that if Pmfw did not exist, the 001 state would have to be a duplicate Per in order to make the loop from Per to Per an even number of steps. Here a serial control bit is used to go from off to Pread, and a write enable line is used to go from Pread to Per. Thus, the strategy of FIG. 13A really requires at least four control lines.

Figure 14A:
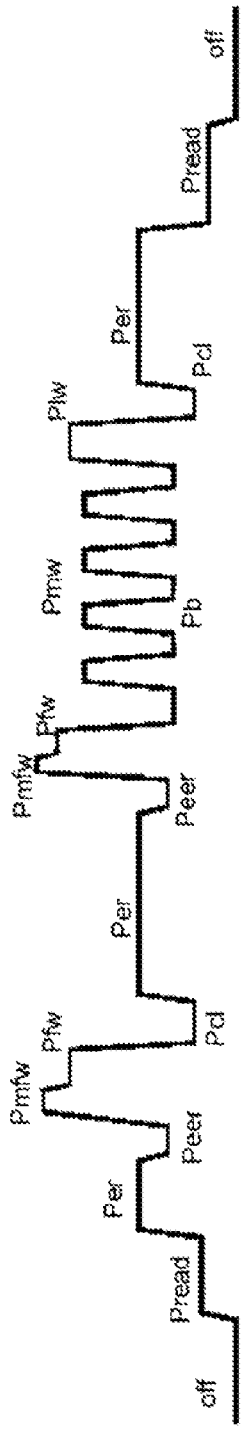
FIG. 14A illustrates an exemplary $I_{OUT}$ signal including ten different states.

Still another example is discussed with reference to FIGS. 14A and 14B. Referring to FIG. 14A, an exemplary $I_{OUT}$ signal is shown as including ten different levels, including an off level, a Pread level, a Per level, a Peer level, a Pmfp level, a Pfw level, a Pcl level, a Pb level, a Pmw level and a Plw level. From the off level, there can be a transition to the Pread level. From the Pread level, there can be a transition to the Per level or to the off level. From the Per level, there can be a transition to the Peer level or the Pread level. From the Peer level, there can only be a transition to the Pmfw level. From the Pmfw level there can only be a transition to the Pfw level. From the Pfw level, there can be a transition to the Pcl level or the Pb level. From the Pcl level, there can be a transition to the Per level. From the Pb level, there can be a transition to the Pmw level or the Plw level. From the Plw level, there can only be a transition to the Pcl level. From the Pmw level, there can only be a transition to the Pb level.

Figure 14B:
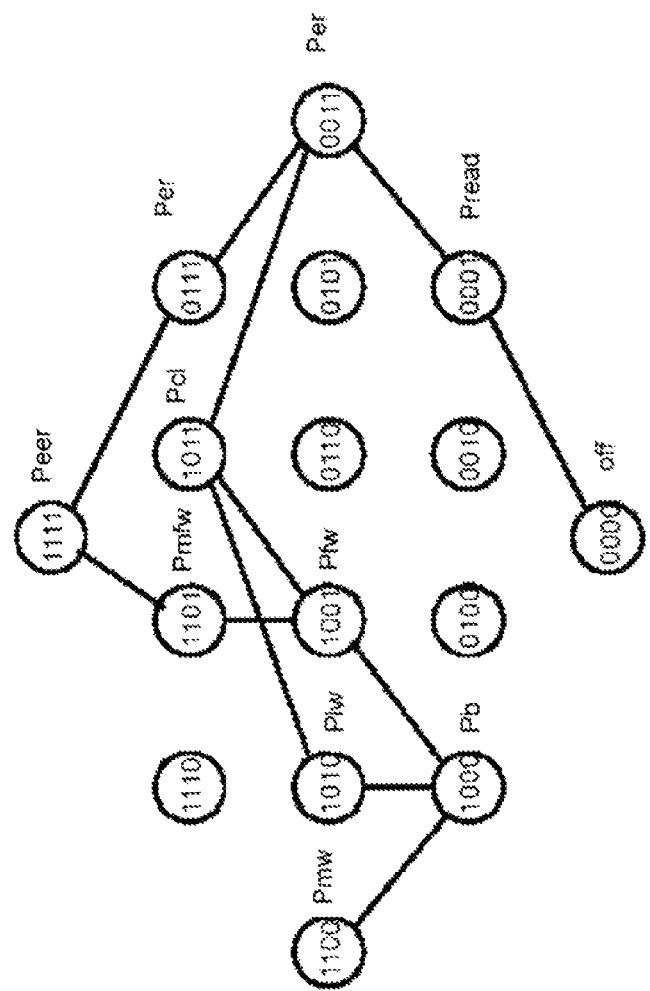
FIG. 14B is a gray code transition diagram that shows how one bit can be changed at a time to transition from any of the $I_{OUT}$ levels shown in FIG. 14A to a next level.

Referring to FIG. 14B, it can be assumed that the ENA line equals 1 for a non-off condition, and 0 for an off condition. The gray code transition diagram of FIG. 14B shows how four enable lines (WEN2, WEN3, WEN4, and WEN5), in addition to the ENA line, can be used to ensure that only one bit changes at a time, regardless of the transition. In FIG. 14B it can be seen that there are two different bit combinations for Per, and that both are transitioned through to get from Per to Peer. More specifically, when transitioning from Per to Peer using the encoding combinations shown in FIG. 14B, the WEN2, WEN3, WEN4, and WEN5 lines will first be 0011 (for Per), then change to 0111 (still for Per), before changing to 1111 (for Peer). This will prevent more than one line from changing at a time. Again the duplicate Per condition is caused by an odd number of transitions from Per to Per.

Conventional LDDs, such as LDD 110 shown in FIG. 1, may rely on sum encoding to produce all the possible $I_{OUT}$ levels needed. Hybrid LDDs of the present invention that use the gray coding techniques discussed above provide an improvement over conventional LDDs because use of the gray coding techniques avoids the timing glitch problems of conventional LDDs. However, some users/customers may not want to alter their controllers to accommodate gray scale encoding. Accordingly, it would be useful to employ serial programmable logic in the decoders 570 of the present invention, to thereby enable the logic to be backwards compatible with sum encoding. More specifically, it would be useful if the decoder 570 can convert the WEN2-WEN5 lines received from the controller 102 into a gray encoded scheme, to prevent the glitch problems that may occur when using conventional timing enable signals REN and WEN2-WEN5, or to be configured per the sum encoding of the conventional LDD. Exemplary logic that can be used within the decoder to do this is discussed with reference to FIGS. 15, 16 and 17.

Figure 15:
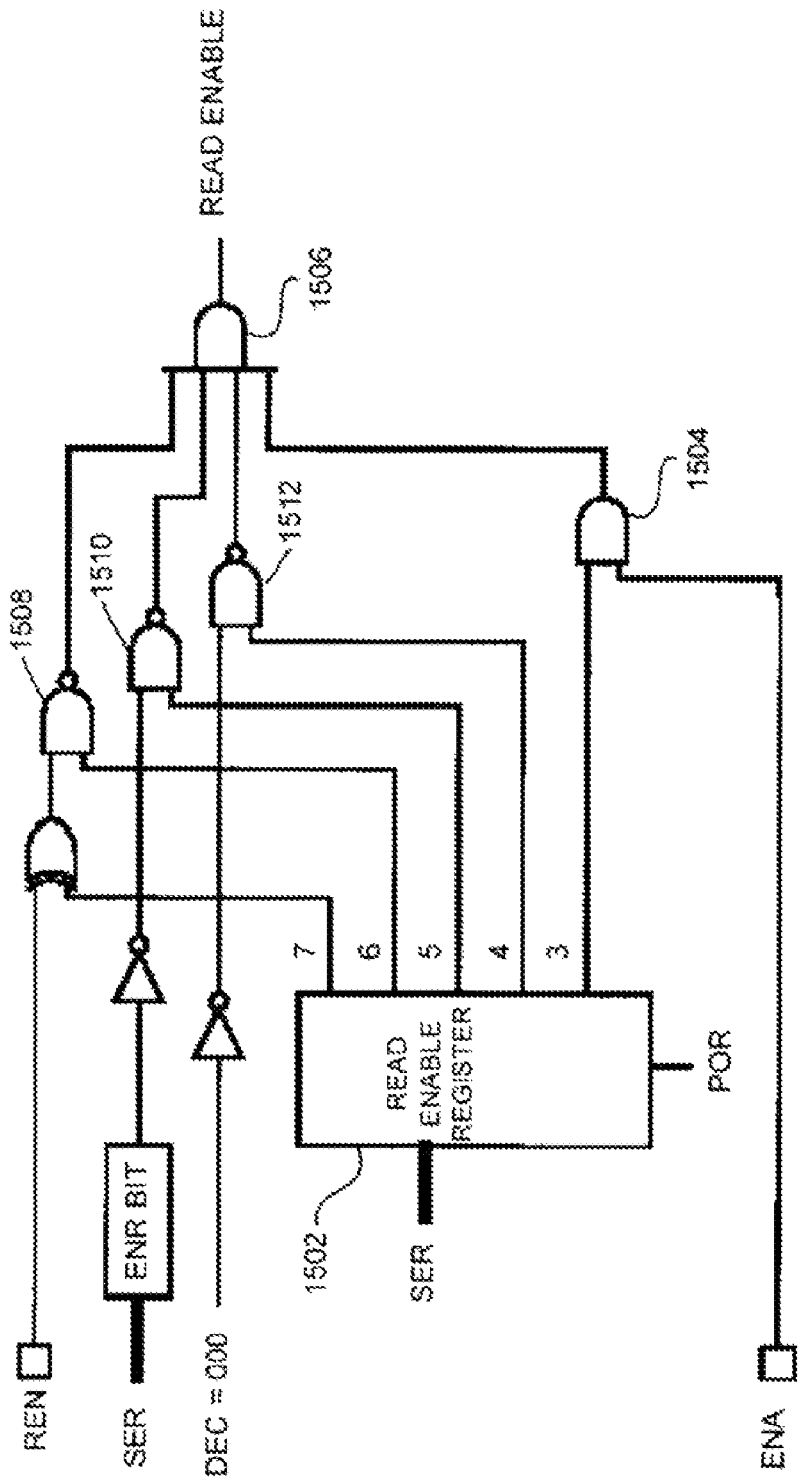
FIG. 15 is a diagram of serial configurable read enable logic of a decoder, according to an embodiment of the present invention.

FIG. 15 is a diagram of serial configurable read enable logic that can be used in the decoders 570, according to embodiments of the present invention. In order to achieve a control logic that suits a variety of user/customer requirements, the control logic can be made adjustable by bits stored in the read enable register 1502, which can be updated by the controller 102 using the SDIO line and the SER bus 319.

Serial bits 3 through 7 all come up zero (0) as a result of the power on reset (POR) signal input. When bit 3 comes up 0 it forces a zero at the output of the AND gate 1504 and AND gate 1506, thereby causing a read enable line of the decode bus 572 to be zero. If bit 3 is set to 1, the ENA signal is allowed to pass to the input of the AND gate 1506. If either bit 3 is zero, or ENA is zero, read will be disabled.

When bits 4, 5 and 6 come up zero they force ones to the outputs of the NAND gates 1508, 1510 and 1512, thereby allowing the output of the AND gate 1506 to go high (i.e., to 1) when bit 3 is set to 1 and ENA is high. Thus, a zero on bits 4, 5 and 6 means ignore the respective signal. If bits 6, 5, or 4 are set to 1, they enable the input of the NAND gates 1508, 1510, 1512 respectively to pass on to the AND gate 1506.

When bit 7 comes up zero, REN with it's polarity is passed unchanged. If bit 7 is set to 1, the polarity of the REN signal is inverted. It is common for REN to be active low, and in this case if REN were to be included in the logic, bit 7 would be set to 0, enabling the input signals to be active low in this logic implementation. Thus for a conventional implementation, bit 7=0, bit 6=1, bit 5=0, bit 4=0, and bit 3=1.

When using a decoder it is logical to have read enabled if the inputs to the decoder were not 000. Thus setting bit 6 and 5 to zero and bit 4 to 1 can cause the read enable line from 1506 to go high when the decode line 000 of the decode bus 572 is not 000. The extra serial ENR BIT can also be ignored or used depending on if bit 5 of 1502 is set to zero or 1.

Figure 16:
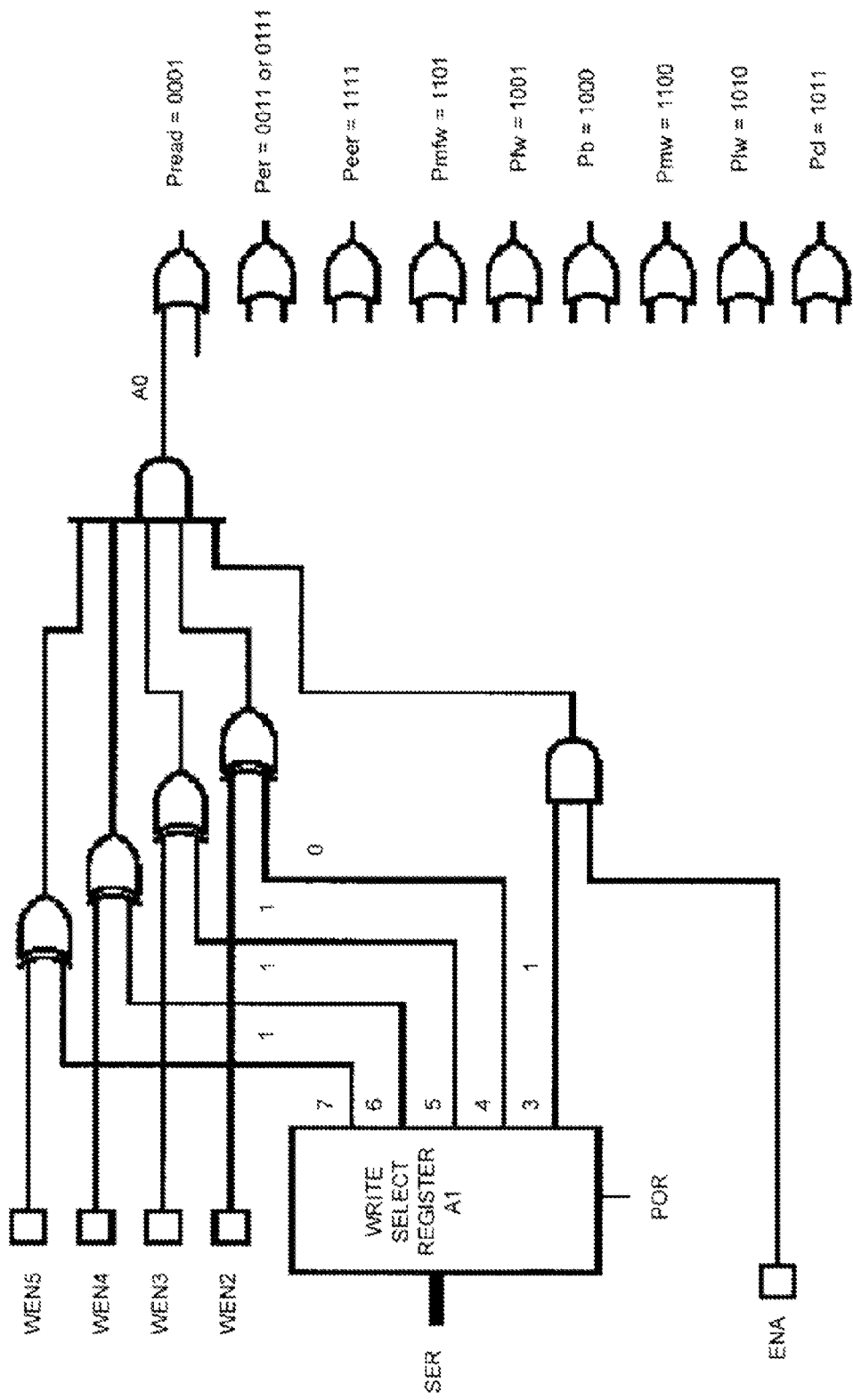
FIG. 16 is a diagram of serial configurable write level enable logic of a decoder, according to an embodiment of the present invention.

FIG. 16 is a diagram of serial configurable write level enable logic, according to an embodiment of the present invention. There are various types of hybrid LDDs discussed above, including 510A, 510B, 610 and 710. The 610 and 710 hybrid LDDs are similar in that some combination of WEN input conditions selects one of the output possibilities of the write channel. In contrast, with the hybrid LDDs 510A and 510B multiple write channels can produce an output simultaneously.

Although all the hybrid LDDs use the WEN type of control input signals, it is presumed that the conventional type of sum encoding could be improved upon. For instance, in the main current transitions at the start and end of a mark it is normal to switch from a sum of the write currents to none or one of the write currents. This offers the maximum probability of glitch generation at the most critical time in the write process. Thus, by gray coding these major transitions, the write process could be improved for any hybrid LDD with an appropriate decoder. It may not be known if the controller 102 being used can accommodate gray scale encoding of the WEN lines. Thus the logic preferably should offer the possibility of gray encoding, while being backward compatible with sum encoding.

In FIG. 16, POR sets all write select bits to zero on power up, disabling all outputs via the AND gate at bit 3. Each power level output has a simple and-or logic with programmable polarities for the input. Usually it is sufficient to have only the Per use both or input conditions. The programming of the serial write select register is just the complement of the desired WEN code word. As shown, Pread is set to respond to code 0001, by programming the select register to 1110. Notice that the Pread is special. It goes to the read enable logic that was previously described before going on to enable the read current. Because only one of the WEN lines changes at a time, it is possible with careful gate design to have one of the write enable lines turn off with a very small time difference from when another write enable line turns on.

Figure 17:
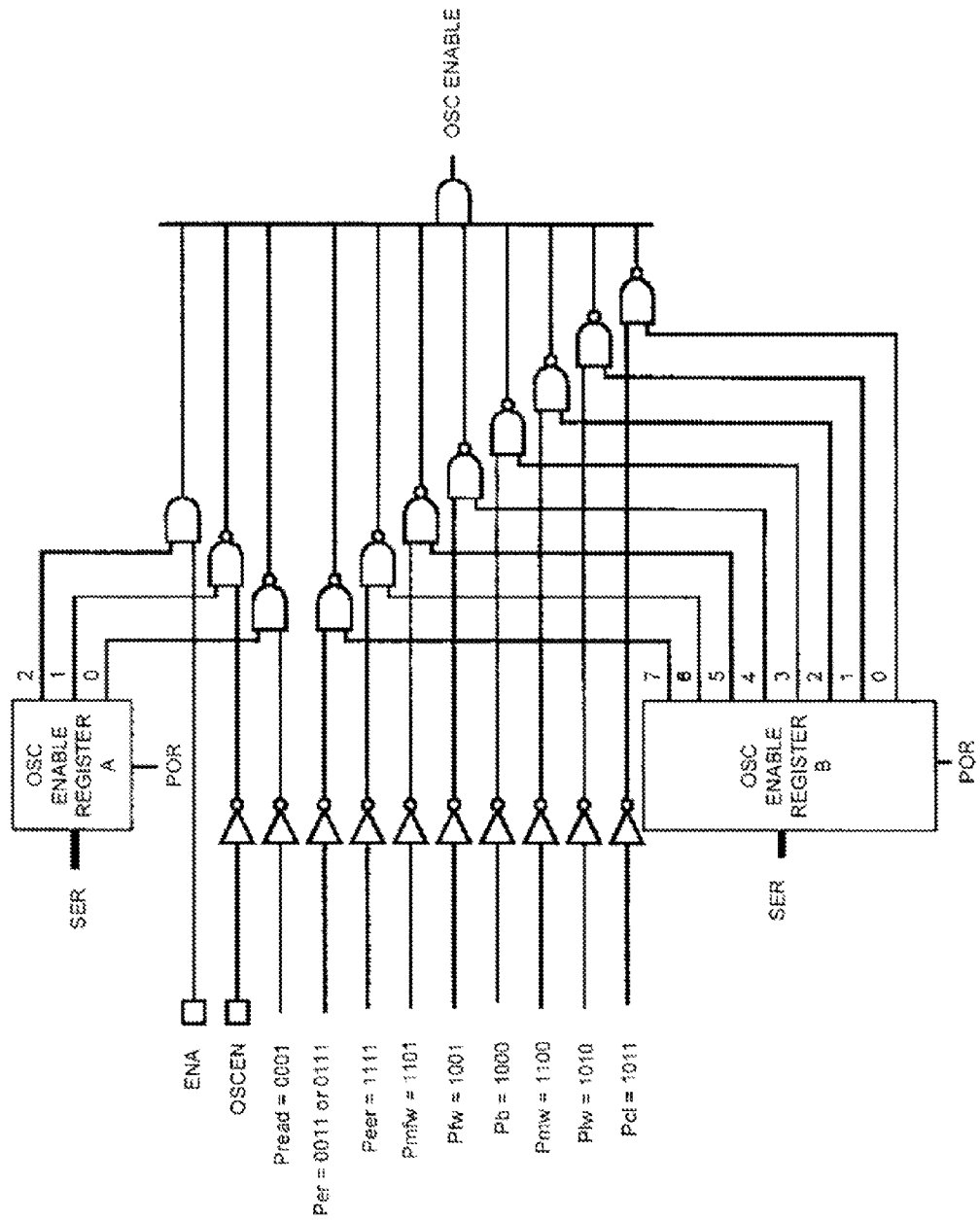
FIG. 17 is a diagram of serial configurable oscillator level enable logic of a decoder, according to an embodiment of the present invention.

FIG. 17 is a diagram of serial configurable oscillator level enable logic, according to an embodiment of the present invention. The oscillator is normally tied to the read or write condition. Thus the oscillator might be always off, on only during read, on during read and erase, or on all the time. For complete flexibility it can also be enabled only when certain states are active. An oscillator control register can have a bit for each state or output enable. It may be desirable that the oscillator turn off quickly, and turn on slowly.

In FIG. 17, when the power comes up, POR sets both registers to all zeros on the outputs. This disables the OSC ENABLE line of the decoder bus 572 through the one AND gate tied to ENA. If at this time a 1 is set in bit 2 register A, the oscillator will be enabled if ENA is one. But normally some other condition is desired for OSC ENABLE. For instance if bit 1 of register A is set to 1, the OSCEN line must also be one to enable the oscillator. The other read and write state conditions have the same logic as the OSCEN line. Thus they are ignored if the control bit is set to zero, and enabled if the control bit is set to one. In this manner the oscillator can be enabled in any combination of read or write conditions.

As can be appreciated from FIGS. 5B, 6 and 7, a state machine can be used in place of the decoder 570, and a state bus can be used in place of the decode bus 572. In the previous gray coded implementations, a WEN control word maps in a fixed way to a state of the LDD. In each state of the LDD, some selection of read, oscillator, and write current is applied. In alternative embodiments that use a state machine, the LDD can still have the same states, but instead of using a one-to-one mapping combinations of WEN control words to the state of the LDD, the states are sequenced in a controlled manner. For example, in normal operation an LDD can go through a normal repeatable sequence: off, read, erase, Pfw, Pcl or Pb, etc. Because the sequencing of the states is fixed for a given write strategy, it is possible to cause this sequencing to occur with less WEN control lines than is used in a fixed mapping approach. When using a state machine it is only necessary to specify how the states changes, not the states themselves.

When using a state machine (e.g., 570), a few input states can represent many output states. Thus, it is possible in an error condition for the state that is desired by the controller 102 to be different from the state existing in the LDD. This would be caused by some kind of error. Once there is a difference in understanding between the state condition between the controller and the LDD, errors will exist until corrected. Thus, it is desirable in a state machine approach to assume that errors might occur, and have a mechanism that forces the LDD back into agreement with the controller 102. The ENA line does this, but it is not desirable to use the ENA line during normal operation. A serial bit could be used, but this would require processor intervention in a process that should be automatic. Thus, a sync function can be encoded in the timing lines of the state machine to achieve the desired results.

FIG. 18A illustrates an exemplary diagram of a typical state machine. FIG. 18B illustrates an exemplary state diagram for an arbitrary state machine. The numbers within the circles are the state numbers. The numbers next to the lines are the numbers on the input lines. In this example the state of the additional output lines are not shown. When the clock rises the state machine responds according to the diagram.

FIG. 19A, which is identical to FIG. 14A, is an exemplary $I_{OUT}$ signal shown as including ten different levels, including an off level, a Pread level, a Per level, a Peer level, a Pmfp level, a Pfw level, a Pcl level, a Pb level, a Pmw level and a Pfw level. FIG. 19B is a corresponding state diagram for the write strategy producing the $I_{OUT}$ signal of FIG. 19A. Here the write strategy is so deterministic that it can be determined with only one bit of input. This one input bit is only necessary at Per, Pfw and Pb. But it is preferred to add a sync feature and simplify the output encoding. The output encoding can be implemented by using the output enable lines (Pread, Per, etc.) to encode the states. A second input line is used to cause a forced state for synchronization.

FIG. 19C is a state diagram in which the output conditions double to serve as the states. This has the advantage of simplifying the logic within the state machine, but it does so by adding more flip flops. Input WEN2 can be used to navigate the state diagram, while input WEN3 can be used to sync the state machine. WEN4 is the clock for the state machine. When using extra flip-flops in this manner, it is possible through error conditions to get states that are not within the state diagram by having more than 1 output equal to 1 at the same time. These extra error states can be suppressed with additional logic.

Figures 20, 21:
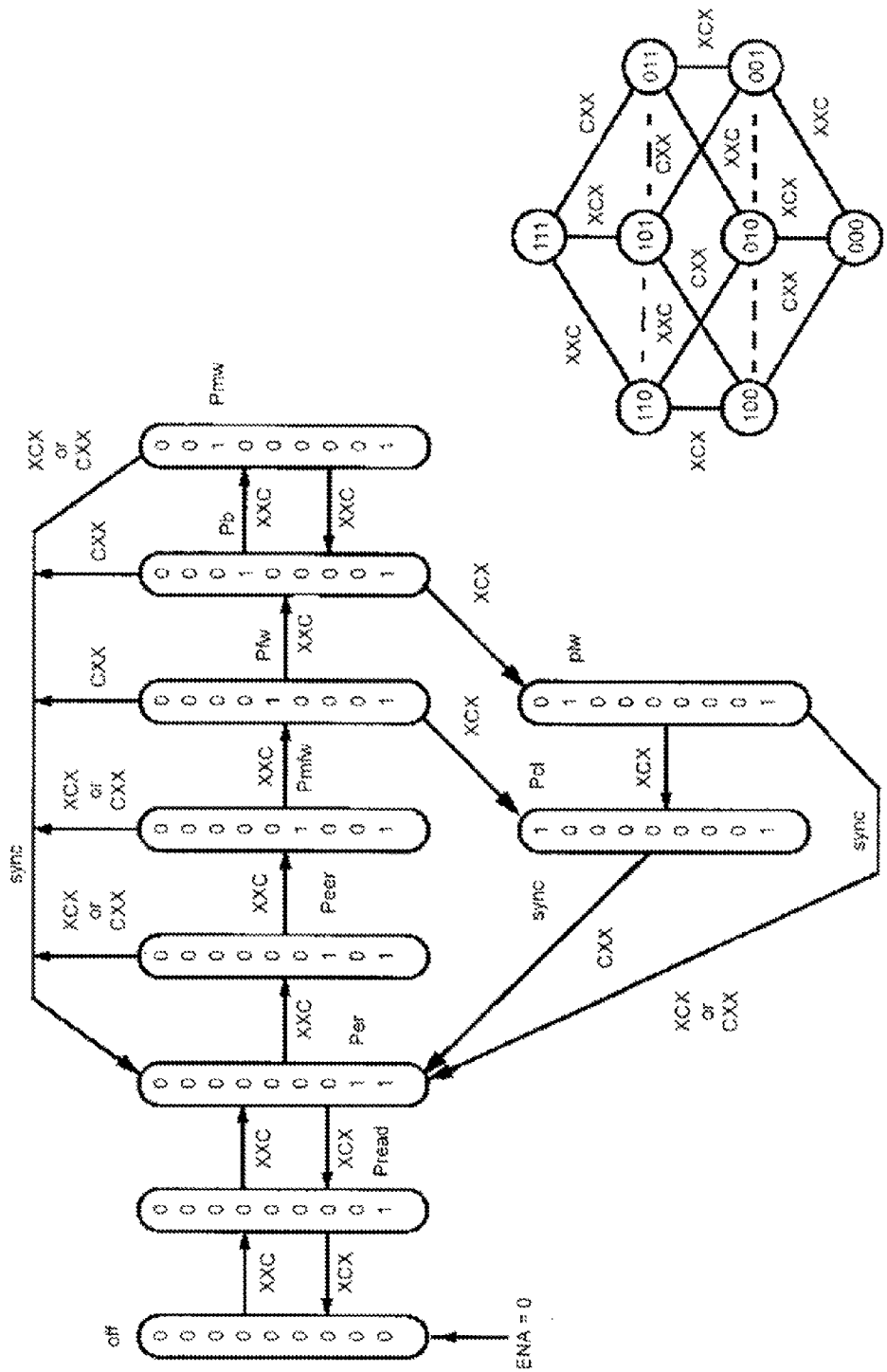
FIG. 20 illustrates an exemplary the state diagram for the state machine of FIG. 19C for implementation of the write strategy of FIG. 19A.
FIG. 21 is an exemplary gray code transition diagram that is useful for describing how the state diagram of FIG. 20 functions.

FIG. 20 is the state diagram for FIG. 19C and corresponds to the write strategy of FIG. 19A and the state diagram of FIG. 19B. As can be seen from the diagram of FIG. 20, at most a state must branch in one of three directions upon being clocked. Therefore in the traditional manner, this can be accomplished with two inputs and a clock.

However another way to use the WEN inputs that does not need the set-up and hold restrictions of clock and data from the controller uses one of the three WEN lines changing to specify the navigation of the state diagram. In the state diagram of FIG. 20, a CXX is always used to go from Pcl. This acts as a sync to prevent error propagation if at any state a CXX moves to the Per state. A XXC means move along as if long marks are present. A XCX occurs to end a mark, or end the write process from Per, or end read.

When using a state machine, there may be, e.g., three direction indicators that can be achieved with two direction bits (e.g., 00, 01, 10). For example, 01 may indicate to proceed in the direction of a long mark, 00 may indicate to return from a mark to a space and then to off, and 10 may be used as a sync and to go to the Per level to achieve a sync function. In order to be able to execute a write strategy, it is preferred to have a state machine that can be configured so that it can execute the write strategy that is necessary at the time. While a traditional state machine may be used for this, a traditional state machine is not perfectly suited to the task at hand. One drawback of a traditional state machine is that the clock line must make two transitions for every state change. In an optical drive, the clock comes from the controller 102 that is located at a distance from the LDD, and separated by the flex circuit 104. There is a bandwidth limitation in this configuration. In order to get repeatable timing on the clock line, the signal needs to settle before making the next transition. Thus, the maximum speed of the state machine is thus limited to a time period consisting of two settling times on the flex cable 104. This clock limitation can be cut in half by using both edges of the clock. To achieve this, in the controller 102 the real clock can be used to clock a divide by 2 flip flop. The divide by 2 flip flop outputs a change for every rising edge of the real clock. This divided clock is then sent over the flex 104 to the LDD. In the LDD, the real clock is re-constituted by using a bi-directional one-shot. But this clock halving trick may not be sufficient for the higher speeds.

Where the controller 102 includes a write strategy generator, the write strategy generator in the controller 102 is probably not configured to put out two input bits and a clock. It is instead configured to put out several timing lines that can be adjusted in fine increments. Each timing line is generated by a timer, which needs a time to complete its timing, then get set up for its next timing, before being required to time out again. Thus, if only one timer is used to cause state changes, the limitations of the timer also become an issue in the speed that can be achieved.

In order to avoid both the clock line speed limit, and the single timer limit, the WEN timers are used in a sequence, in accordance with specific embodiments. For instance, if the sequence is 'forward' (00, 01, 11, 10, 00 etc.), the state machine would advance toward a long mark, similar to the data 01 condition outlined previously. If the sequence is reverse (00, 10, 11, 01, 11, etc.), the state machine would advance back to Per and off. With this scheme, two bits are not sufficient to also incorporate a sync function while maintaining gray encoding. It can also be seen that the loops (Pb-Pmw-Pb etc) could also rely on a single timer to repeat its changes. Thus, more bits or WEN lines may be used. With three WEN lines, a sequence can proceed in three directions and still maintain gray encoding. For instance if the first bit changes it can mean to move to one state, if the second bit changes it can mean to move to another state, and if the third bit changes, it can mean to go to still a third state. From the examples so far, this is sufficient to do all the write strategies, and include the sync function.

Figure 22:
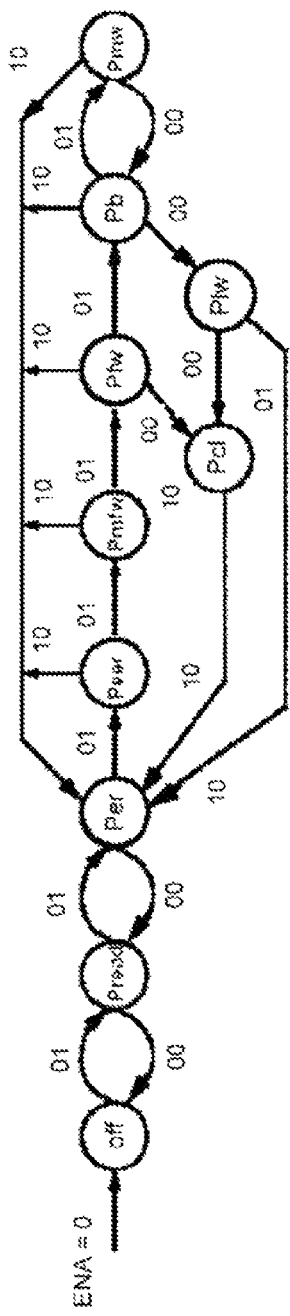
FIG. 22 illustrates an exemplary state diagram which is used to illustrate how two bits can be used to transition among states of the diagram, in accordance with embodiments of the present invention.

To remove the speed restriction of settling time on one line, and single timer limitation in normal operation, a new bit can be changed at each state transition. For example, in the state diagram shown in FIG. 22, if bit 0 changed going into state Pb, a change in bit 1 could move to state Pmw, and a change in bit 2 could move to state Plw. Here, there is not the ability to move to Per as a sync condition without repeating a change in bit 0, which is a violation of the speed conditions. To get fast sync for error correction, a 4th WEN line can be used. But that may not be desirable. The alternative is to have a less robust sync, that moves to Per for state machine paths that normally only have one new state to advance to. Thus, the three way branch from states is avoided, with the drawback that re-sync in case of errors will not occur from those states that need a two way branch for normal operation. The state diagram of FIG. 22 is re-drawn in FIG. 23 illustrating this solution.

Figure 23:
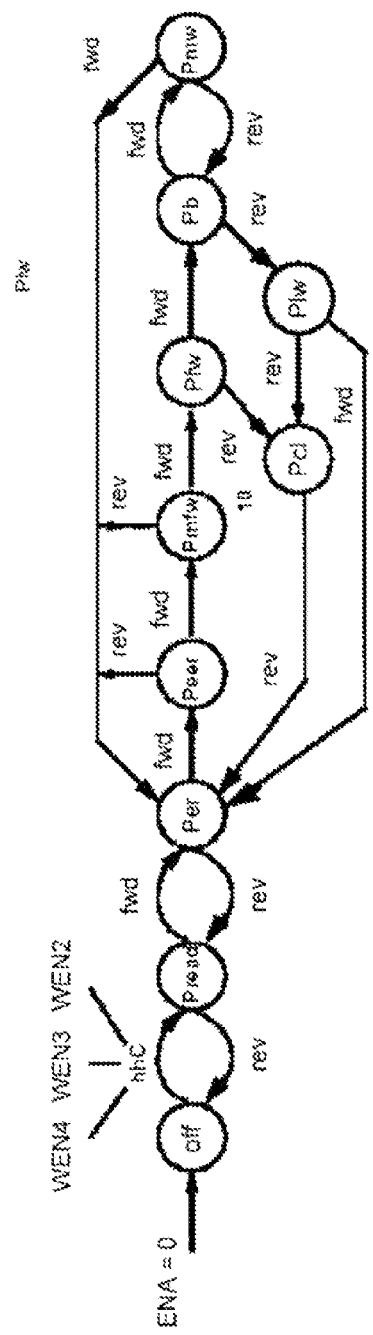
FIG. 23 illustrates an exemplary state diagram which is used to illustrate how three enable lines can be used to transition among states of the diagram, in accordance with embodiments of the present invention.

The state diagram of FIG. 23 is used to show how three enable lines (e.g., WEN2, WEN3 and WEN4) can be used such that only one line changes at a time, alternating lines of change are used, and the state diagram can be navigated with some sync capability. "hhC" means that WEN2 changes. "fwd" means that the changes rotate in a forward or increasing manner. This would be as if the lines went like 000 to 001, to 011, to 111, to 110, to 100, to 000. "rev" means that the changes rotate in a reverse or decreasing manner. This would be as if the lines went like 000 to 100 to 110, to 111 to 011 to 001 to 000. For the controller 102 to implement this, the respective WEN lines would each toggle a divide-by-two flip flop. The controller's timers should also be programmed to change according to the state machine. For the LDD to implement this change sensing, there can be bi-directional flip flops on each WEN line, a last changed register, fwd/rev logic, and the modifications to the state machine to make it respond according to the state diagram.

Figure 24:
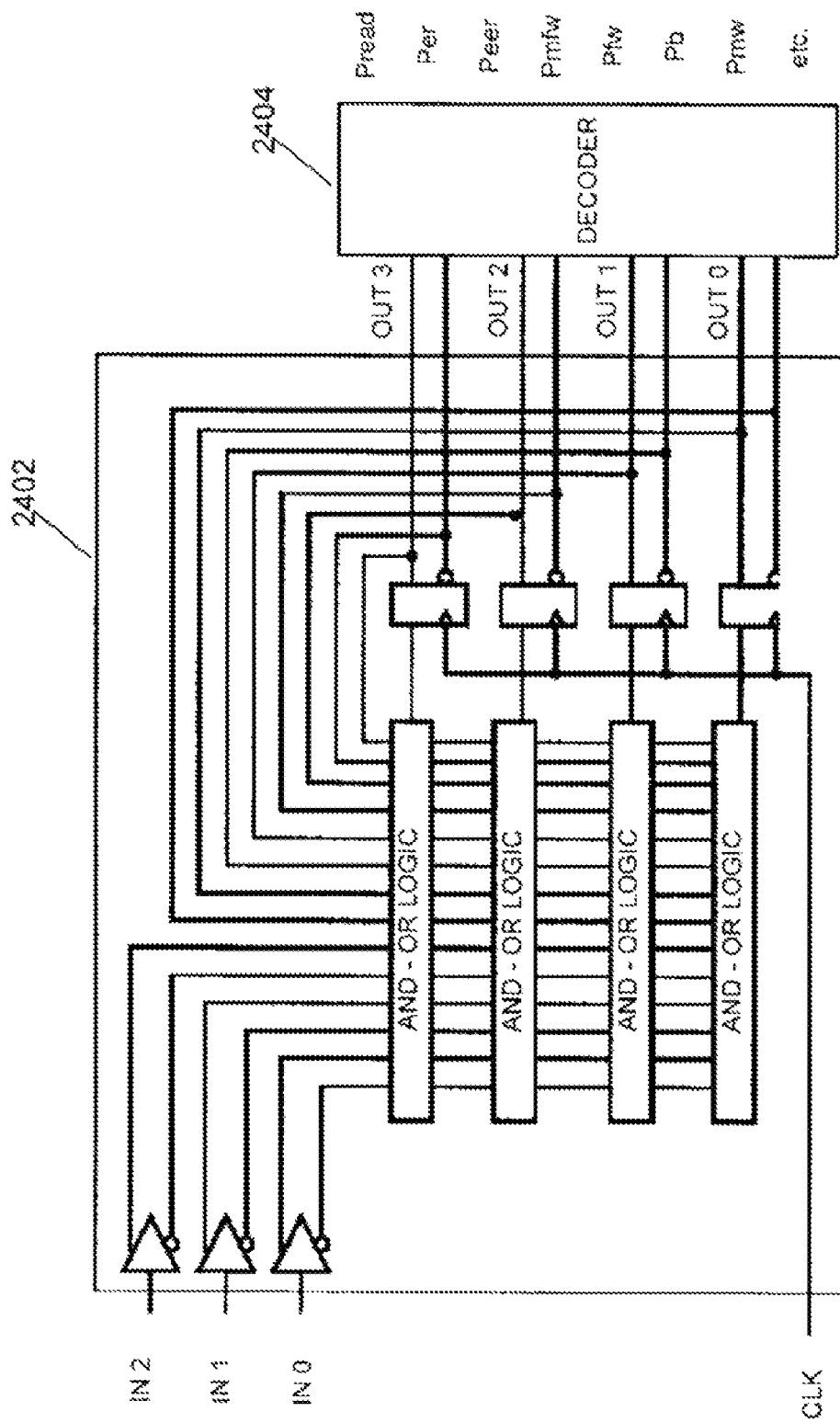
FIG. 24 illustrates exemplary details of a standard state machine, with a decoder added at the output, in accordance with embodiments of the present invention.

It is also possible that a state machine be used together with a decoder, as can be appreciated from FIG. 24, which shows an exemplary standard state machine 2402 with an output decoder 2404. In the standard state machine, each state is typically determined by a D flip flop. The flip flops are each fed a signal through an and-or logic network. The and-or logic network has access to each output and it's complement, and each input and it's complement. Thus each output can be made to change or stay the same depending on the selection done through the and-or logic. The state machine 2402 changes on the rising edge of the clock. As it stands, the standard state machine is not well suited to the task of converting input signal (WEN signals and a clk input) to output enable signals. Further it has the bandwidth problems previously mentioned at the clk input. Nevertheless it is useful to see what might be changed to allow a standard state machine to act as a conventional LDD, or a hybrid LDD.

Figure 25:
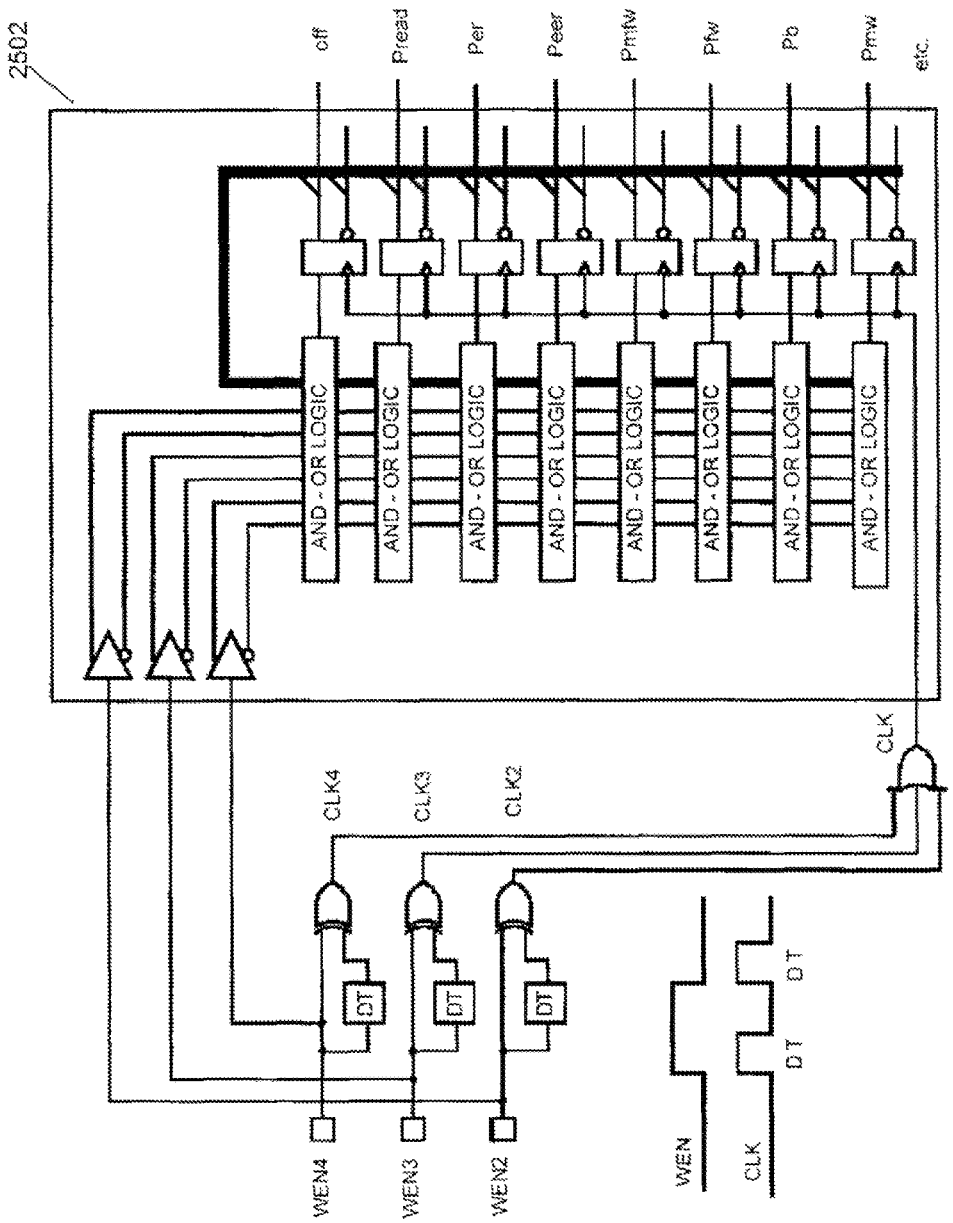
FIG. 25 illustrates a state machine with an embedded decoder, in accordance with an embodiment of the present invention.

In FIG. 25, a state machine 2502 has been modified to use the output power selection states as it's states rather than binary encoded states. In front of the state machine 2502 three bi-directional one-shots have been added. If any of the WEN lines changes either way, a clock is produced, that clocks the state machine 2502 from one state to another depending on the state of the WEN lines. Advantages of this configuration is that the and-or logic is simplified, and the extra decoder (2404 of FIG. 24) is eliminated. But it is possible, if extra logic is not included, to enable multiple outputs simultaneously. Also, it uses more feedback lines and has more flip-flops. For the above diagram to implement the sum encoding of a conventional LDD, the outputs are ignored, and the state of each WEN input is directly mapped to one output. Thus if WEN4 was high during any change in WEN, one of the outputs (corresponding to channel 4) would be enabled.

The state machine 2502 of FIG. 25 can also implement a gray coded hybrid. Recall that in a specific gray coded hybrid, each output state is associated with a unique WEN state. The state machine would not care how the WEN state occurred. The state machine would decode the WEN input conditions directly to the output state while ignoring the output conditions. The state machine of FIG. 25 can also be configured such that any change in WEN is combined with the WEN states to determine the change in the state machine. This implementation also includes the sync function from any state with only the three inputs. It may also be configured to respond to gray coded inputs.

The state machine 2502 of FIG. 25 can also be configured such that a change in one line means go forward, and a change in a second line means go reverse, and a change in a third line means go to Per. But, state machine of FIG. 25 can not be configured so a positive rotation of the WEN changes means to go forward, and a negative rotation of the WEN lines means to go reverse. To implement that, the WEN states need to be remembered.

Figure 26:
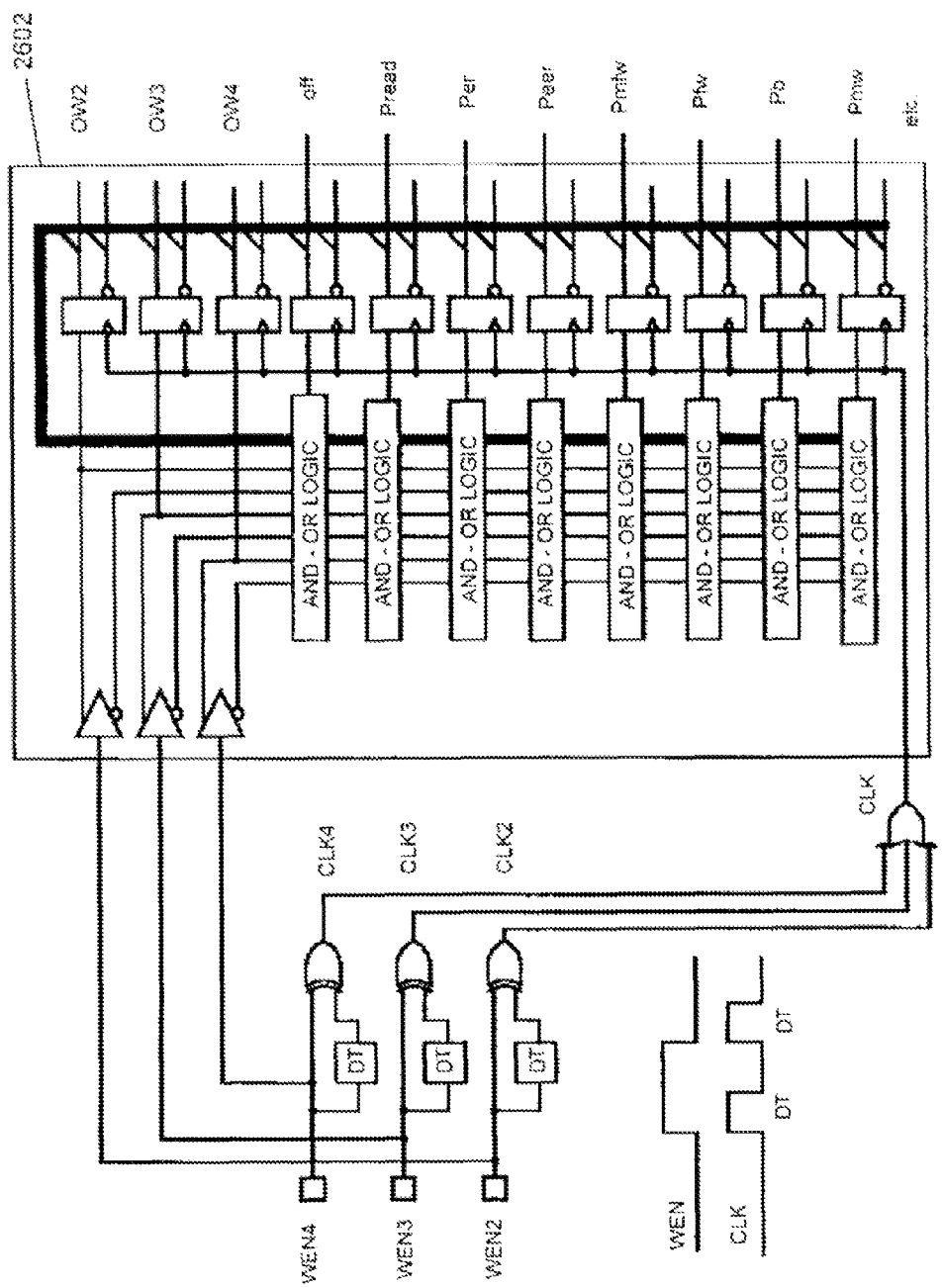
FIG. 26 illustrates a state machine with an embedded decoder and state memory, in accordance with an embodiment of the present invention.

FIG. 26 illustrates a state machine 2602 including WEN state memory added and an embedded decoder. This configuration can use the previous WEN state and the next WEN state to determine if the inputs have changes rotating in the forward direction or reverse direction. This added capability allows the inputs to be encoded to change sequentially thus allowing the timers in the controller time to be set-up during the time that another timer is timing out. It also allows the time interval on any of the WEN lines to be increased, thus allowing more time for the signals of the WEN lines to settle, and thereby reduce timing errors. In this and previous embodiments, the serial interface and serial bus can be used to configure the and-or logic.

The hybrid concepts of the present invention described above can also be applied to LDDs of laser printers. At the present time, it is common to provide a trickle current to the laser of a laser printer when it is not writing. During writing, the laser is switched to being driven by a high current level. Also, there is a period of time set aside for doing automatic power control during each sweep of the laser past the paper drum.

In laser printers, there has been a trend for a need to go to higher write speeds, and a need for gray scale control. One of the methods of gray scale control is to use pulsed light. Another way is to use different write currents. For the pulsed method, it is desirable to control the current to a threshold level in order to minimize the turn-on delay of the laser. All of this points to the need for more power levels in the laser printer market. The hybrid concepts described herein, including the use of decoders and state machines, allow for many power levels with a minimum of control lines.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The forgoing description is of the preferred embodiments of the present invention. These embodiments have been provided for the purposes of illustration and description, but are not intended to be exhaustive or to limit the invention to the precise forms disclosed. Many modifications and variations will be apparent to a practitioner skilled in the art. Embodiments were chosen and described in order to best describe the principles of the invention and its practical application, thereby enabling others skilled in the art to understand the invention. It is intended that the scope of the invention be defined by the following claims and their equivalents.

What is claimed is:

1. A hybrid laser diode driver (LDD) for driving a laser diode in response to receiving enable signals from a controller, the hybrid LDD comprising:
   a read channel to output a read current;
   a plurality of write channels,
      wherein each of the write channels includes a corresponding digital-to-analog converter (write DAC) that is used to produce a different write current, and
      wherein each of the write channels, downstream of the DAC of the write channel, includes a corresponding switch;
   an oscillator channel to output an oscillator current;
   registers to store amplitude values for the write channels, wherein the amplitude values stored in the registers are used to define amplitudes of the write currents produced by the write channels; and
   a decoder that receives a plurality of enable signals from the controller, and based on the enable signals, controls the switches of the write channels to thereby control which of the plurality of different write currents are summed with at least one of the read current and the oscillator current to produce a drive output current for driving the laser diode.

2. The hybrid LDD of claim 1, wherein each of the write channels includes an amplifier between the DAC of the write channel and the switch of the write channel, wherein the amplifier of the write channel amplifies an analog current output by the DAC of the write channel to thereby produce the write current for the write channel.

3. The hybrid LDD of claim 1, further comprising:
   a serial interface to receive serial data from the controller;
   wherein the serial data is used to update the amplitude values stored in the registers.

4. The hybrid LDD of claim 3, wherein the serial data received from the controller is also used to configure the decoder.

5. The hybrid LDD of claim 1, wherein the hybrid LDD is configured to be located on a same optical pickup unit (OPU)

as the laser diode, wherein the OPU is connected by a flex cable to the controller, and wherein the controller is on a main board.

6. The hybrid LDD of claim 1, wherein each write channel is associated with at least one of the registers, which stores the amplitude value for the write channel.

7. The hybrid LDD of claim 1, further comprising:
a plurality of further registers to store amplitude values for the read channel and the oscillator channel; and
wherein the read channel includes a digital-to-analog converter (read DAC) that receives an amplitude value from at least one of the further registers and outputs an analog signal based thereon, which is used to produce the read current output by the read channel; and
wherein the oscillator channel includes a digital-to-analog converter (oscillator DAC) that receives an amplitude value from at least one of the further registers and outputs an analog signal based thereon, which is used to produce the oscillator current output by the oscillator channel.

8. The hybrid LDD of claim 7, wherein:
the read channel, downstream of the DAC of the read channel, includes a corresponding switch that is controlled by the decoder; and
the decoder controls the timing of the read channel by controlling the switch of the read channel, based on the enable signals received by the decoder from the controller.

9. The hybrid LDD of claim 7, wherein:
the oscillator channel, downstream of the DAC of the oscillator channel, includes a corresponding switch controlled by the decoder based on the enable signals received by the decoder from the controller.

10. The hybrid LDD of claim 1, wherein:
the enable signals received by the decoder from the controller are Gray coded such that only one of the enable signals changes at a time.

11. A method for producing a current for driving a laser diode in response to receiving enable signals from a controller, comprising:
storing a plurality of digital amplitude write values;
converting each of the stored plurality of digital amplitude write values to a corresponding write current, to thereby produce a plurality of different write currents;
receiving enable signals from the controller;
decoding the enable signals received from the controller;
producing the current for driving the laser diode by selecting one or more of the write currents, in dependence on results of the decoding, and summing the selected one or more of the write currents with at least one of a read current and an oscillator current.

12. The method of claim 11, wherein the converting step comprises:
converting each of the stored plurality of digital amplitude write values to the corresponding write current using a separate digital-to-analog converter (write DAC).

13. The method of claim 12, wherein the converting step further comprises amplifying a current output by each of the DACs to produce the plurality of write currents.

14. The method of claim 11, wherein the enable signals received from the controller are Gray coded such that only one of the enable signals changes at a time.

15. The method of claim 11, wherein the producing step comprises:
producing the current for driving the laser diode by selecting at least two of the write currents, in dependence on results of the decoding, and summing the selected at least two of the write currents with the read current.

16. The method of claim 11, further comprising:
producing the read current in dependence on results of the decoding.

17. The method of claim 11, further comprising:
producing the oscillator current in dependence on results of the decoding.

18. The hybrid LDD of claim 1, further comprising:
a plurality of further registers to store amplitude values for the read channel; and
wherein the read channel includes a digital-to-analog converter (read DAC) that receives an amplitude value from at least one of the further registers and outputs an analog signal based thereon, which is used to produce the read current output by the read channel.

19. The hybrid LDD of claim 1, further comprising:
a plurality of further registers to store amplitude values for the oscillator channel; and
wherein the oscillator channel includes a digital-to-analog converter (oscillator DAC) that receives an amplitude value from at least one of the further registers and outputs an analog signal based thereon, which is used to produce the oscillator current output by the oscillator channel.

20. The hybrid LDD of claim 7, wherein the oscillator channel is controlled by the decoder based on the enable signals received by the decoder from the controller.

21. The hybrid LDD of claim 1, wherein the enable signals received by the decoder from the controller include a plurality of write enable signals that are Gray coded such that only one of the write enable signals changes at a time.

22. The method of claim 11, wherein the enable signals received from the controller include a plurality of write enable signals that are Gray coded such that only one of the write enable signals changes at a time.

* * * * *